US012177899B2

(12) United States Patent
Jiang et al.

(10) Patent No.: US 12,177,899 B2
(45) Date of Patent: Dec. 24, 2024

(54) METHOD AND DEVICE FOR USE IN WIRELESS COMMUNICATION NODES

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 476 days.

(21) Appl. No.: 17/485,543

(22) Filed: Sep. 27, 2021

(65) Prior Publication Data

US 2022/0046704 A1    Feb. 10, 2022

Related U.S. Application Data

(63) Continuation of application No. PCT/CN2020/081004, filed on Mar. 25, 2020.

(30) Foreign Application Priority Data

Apr. 9, 2019   (CN) .......................... 201910278464.1

(51) Int. Cl.
*H04W 74/0808* (2024.01)
*H04W 72/044* (2023.01)

(52) U.S. Cl.
CPC ..... *H04W 74/0808* (2013.01); *H04W 72/044* (2013.01)

(58) Field of Classification Search
CPC ........... H04W 74/0808; H04W 72/044; H04W 72/232; H04W 72/0453; Y02D 30/70;
(Continued)

(56) References Cited

U.S. PATENT DOCUMENTS

| 2017/0374679 | A1 | 12/2017 | Park et al. |
| 2018/0139781 | A1 | 5/2018 | Park |

(Continued)

FOREIGN PATENT DOCUMENTS

| CN | 103209053 A | 7/2013 |
| CN | 106982111 A | 7/2017 |

(Continued)

OTHER PUBLICATIONS

First Office Action of Chinses patent application No. CN201910278464.1 dated Jan. 5, 2023.

(Continued)

*Primary Examiner* — Mohammad S Adhami
*Assistant Examiner* — Jesse P. Samluk

(57) ABSTRACT

A method and a device for use in wireless communication nodes are disclosed in the present disclosure. A first node firstly performs channel listening to determine that K1 sub-bands out of K sub-bands are idle; and then transmits a first control information block and a second control information block on a first channel; the first channel occupies the K1 sub-bands of the K sub-bands; K1 repetitions of the first control information block are respectively transmitted by the K1 sub-bands, while the second control information block is transmitted only once on the first channel; the first control information block is used to indicate a sub-band occupied by the second control information block. The present disclosure categorizes UCI and transmits in different ways, so that different groups of UCI can be mutually indicated, thus enhancing the uplink transmission efficiency and performance on Unlicensed Spectrum.

20 Claims, 7 Drawing Sheets

(58) Field of Classification Search
CPC ... H04L 5/0033; H04L 5/0039; H04L 5/0053; H04L 1/1822; H04L 1/08; H04L 5/0048; H04B 17/309; H04B 17/382
See application file for complete search history.

(56) References Cited

U.S. PATENT DOCUMENTS

| | | | | |
|---|---|---|---|---|
| 2018/0352563 | A1* | 12/2018 | Liu | H04L 1/1812 |
| 2019/0053265 | A1 | 2/2019 | Kim | |
| 2019/0149285 | A1* | 5/2019 | Tsai | H04L 1/0026 370/329 |
| 2019/0319766 | A1* | 10/2019 | Baldemair | H04W 72/23 |
| 2020/0221310 | A1* | 7/2020 | Babaei | H04W 72/0466 |
| 2022/0015122 | A1* | 1/2022 | Chai | H04L 5/0037 |
| 2022/0166576 | A1* | 5/2022 | Harada | H04L 27/0006 |

FOREIGN PATENT DOCUMENTS

| | | |
|---|---|---|
| CN | 108352937 A | 7/2018 |
| CN | 108633020 A | 10/2018 |
| CN | 109151833 A | 1/2019 |

OTHER PUBLICATIONS

First Search Report of Chinses patent application No. CN201910278464.1 dated Dec. 23, 2022.
Huawei, HiSilicon HARQ enhancements in NR unlicensed 3GPP TSG RAN WG1 Meeting #94 R1-1808063 Aug. 11, 2018.
Huawei, HiSilicon HARQ enhancements in NR unlicensed 3GPP TSG RAN WG1 Meeting #94bis R1-1810128 Sep. 29, 2018.
ISR in application PCT/CN2020/081004 dated May 26, 2020.
Huawei et al."HARQ Enhancements in NR Unlicensed" 3GPP TSG RAN WG1 Meeting #95 R1-1812196, Nov. 16, 2018(Nov. 16, 2018).

* cited by examiner

METHOD AND DEVICE FOR USE IN WIRELESS COMMUNICATION NODES

CROSS REFERENCE TO RELATED APPLICATIONS

This application is a continuation of International Application No. PCT/CN2020/081004, filed Mar. 25, 2020, claims the priority benefit of Chinese Patent Application No. 201910278464.1, filed on Apr. 9, 2019, the full disclosure of which is incorporated herein by reference.

BACKGROUND

Technical Field

The present disclosure relates to transmission methods and devices in wireless communication systems, and in particular to a method and device for transmitting UCI in wireless communications.

Related Art

Application scenarios of future wireless communication systems are becoming increasingly diversified, and different application scenarios have different performance demands on systems. In order to meet different performance requirements of various application scenarios, in the design of New Radio (NR) in Rel-15, Beamforming is widely applied with the purpose of enhancing transmission performance. In an NR system in Rel-16, a Study Item (SI) targeting NR-Unlicensed (NR-U) physical-layer enhancement was proposed at the RAN #81 Plenary to further improve transmission performance and reducing transmission delay. With respect to this subject, wireless transmissions in multiple unlicensed Bandwidth Parts (BWPs) will be studied and designed.

SUMMARY

According to the latest progress achieved in NR-U discussions at the RANI #95 conference, when uplink transmissions are performed on a plurality of unlicensed BWPs, a feasible way is to configure and activate the BWPs and the Physical Uplink Shared Channel (PUSCH) is transmitted on one or more BWPs; furthermore, Listen Before Talk (LBT) based on Subband and corresponding PUSCH transmission are also discussed in RANI. However, in the current NR system, when a UE transmits a Physical Uplink Control Channel (PUCCH) and a PUSCH simultaneously in a slot, Uplink Control Information (UCI) corresponding to the PUCCH is piggybacked for transmission in time-frequency resources reserved for the PUSCH. The advantage of the above method lies in guaranteeing adequate uplink transmitting power and not causing high Peek-to-Average Power Ratio (PAPR). But when the PUSCH is transmitted in only part of sub-bands that have passed LBT, how to transmit piggybacked UCI will become a problem.

To address the above problem, a simple solution is to let UCI follow the PUSCH transmission mode, namely, UCI will be transmitted on sub-bands that passed LBT, while on those sub-bands failing to pass the LBT, UCI transmission will be dropped; apparently this method will have a negative impact on the performance of UCI transmission. In this regard, the present disclosure provides a solution to enhance the UCI transmission performance on NR-U. It should be noted that the embodiments of the first node of the present disclosure and the characteristics in the embodiments may be applied to a base station and that the embodiments of the second node of the present disclosure and the characteristics in the embodiments may be applied to a terminal if no conflict is incurred, and vice versa. In the case of no conflict, the embodiments of the present disclosure and the characteristics in the embodiments may be combined with each other arbitrarily.

The present disclosure provides a method in a first node for wireless communications, comprising:
   performing channel listening to determine that K1 sub-bands out of K sub-bands are idle;
   transmitting a first control information block and a second control information block on a first channel;
   herein, the first channel occupies the K1 sub-bands of the K sub-bands; K1 repetitions of the first control information block are respectively transmitted by the K1 sub-bands, while the second control information block is transmitted only once on the first channel; the first control information block is used to indicate a sub-band occupied by the second control information block; mapping of the second control information block in a sub-band is unrelated to K1; K is a positive integer greater than 1, and K1 is a positive integer greater than 1 and no greater than K.

In one embodiment, an advantage of the above method is that Uplink Control Information (UCI) is split into a first control information block and a second control information block, of which the former has higher demands on robustness and thus needs to be repeatedly transmitted, while the latter is transmitted only once; this practice not only ensures the performance of the first control information block but also avoids excess UCI payload increases.

In one embodiment, a second advantage of the above method is that by using the first control information block for indicating a sub-band occupied by the second control information block, and then selecting the sub-band occupied by the second control information block according to a LBT result, the transmission performance of the second control information block will be enhanced.

In one embodiment, a third advantage of the above method is that the design in the present disclosure does not relate to recoding and remapping of resources on UCI according to the LBT result; before transmitting UCI, the first node splits UCI into a first control information block and a second control information block, the first control information block is encoded in a repeated manner, while the second control information block is encoded in a way of only mapping to one sub-band; since frequency-domain resources occupied by a sub-band are fixed, both the mapping of radio signals generated by the first control information block and the mapping of radio signals generated by the second control information block are unrelated to K1, that is, the LBT result, thus avoiding too many increases in the first node's implementation complexity.

According to one aspect of the present disclosure, the above method is characterized in comprising:
   transmitting first data on the first channel;
   herein, the second control information block and the first data occupy a same sub-band, and mapping of the first data in a sub-band is unrelated to K1.

In one embodiment, the above method is advantageous in that the first data belongs to a data channel carrying the second control information block, which improves the spectrum efficiency and reduces the PAPR, thereby preventing the control channel from dominating a sub-band.

According to one aspect of the present disclosure, the above method is characterized in comprising:
  transmitting second data on the first channel;
  herein, the second data occupies each sub-band among the K1 sub-bands other than the sub-band occupied by the second control information block, and mapping of the second data in a sub-band is unrelated to K1.

In one embodiment, the above method is advantageous in that the radio signal generated by the second data carries only the first control information block rather than the second control information block, thus further enhancing uplink spectrum efficiency.

According to one aspect of the present disclosure, the above method is characterized in comprising:
  receiving a first signaling;
  herein, the first signaling is used to indicate configuration information of the first channel, the configuration information of the first channel comprising the K1 sub-bands.

According to one aspect of the present disclosure, the above method is characterized in comprising:
  receiving first information;
  herein, the first information is used to determine K priorities corresponding to the K sub-bands, and the second control information block occupies a first sub-band, the first sub-band being a sub-band of highest priority among the K1 sub-bands.

In one embodiment, the above method is advantageous in that a base station indicates to the first node a sub-band with the best performance according to the receiving performances having been counted, and suggests that when the LBT is performed throughout multiple sub-bands, the first node is to select the best-performing sub-band from these sub-bands to report the first control information block, thus further improving uplink performance.

According to one aspect of the present disclosure, the above method is characterized in comprising:
  receiving a second signaling and a second radio signal;
  herein, the second signaling is used for determining at least one of a time-domain resource occupied by the second radio signal or a frequency-domain resource occupied by the second radio signal; the second control information block is used for determining whether the second radio signal is correctly received.

According to one aspect of the present disclosure, the above method is characterized in comprising:
  receiving a first reference signal;
  herein, the first reference signal is used for determining the second control information block.

The present disclosure provides a method in a second node for wireless communications, comprising:
  detecting a first control information block and a second control information block on K sub-bands;
  herein, the first channel occupies K1 sub-bands of the K sub-bands; K1 repetitions of the first control information block are respectively transmitted by the K1 sub-bands, while the second control information block is transmitted only once on the first channel; the first control information block is used to indicate a sub-band occupied by the second control information block; a transmitter of the first control information block is a first node, and the first node performs channel listening to determine that the K1 sub-bands out of the K sub-bands are idle; mapping of the second control information block in a sub-band is unrelated to K1; K is a positive integer greater than 1, and K1 is a positive integer greater than 1 and no greater than K.

According to one aspect of the present disclosure, the above method is characterized in comprising:
  detecting a first control information block and a second control information block on K sub-bands;
  herein, the first channel occupies K1 sub-bands of the K sub-bands; K1 repetitions of the first control information block are respectively transmitted by the K1 sub-bands, while the second control information block is transmitted only once on the first channel; the first control information block is used to indicate a sub-band occupied by the second control information block; a transmitter of the first control information block is a first node, and the first node performs channel listening to determine that the K1 sub-bands out of the K sub-bands are idle; mapping of the second control information block in a sub-band is unrelated to K1; K is a positive integer greater than 1, and K1 is a positive integer greater than 1 and no greater than K.

According to one aspect of the present disclosure, the above method is characterized in comprising:
  detecting first data on the K sub-bands;
  herein, the second control information block and the first data occupy a same sub-band out of the K1 sub-bands, and mapping of the first data in a sub-band is unrelated to K1.

According to one aspect of the present disclosure, the above method is characterized in comprising:
  detecting second data on the K sub-bands;
  herein, the second data occupies each sub-band among the K1 sub-bands other than the sub-band occupied by the second control information block, and mapping of the second data in a sub-band is unrelated to K1.

According to one aspect of the present disclosure, the above method is characterized in comprising:
  transmitting a first signaling;
  herein, the first signaling is used to indicate configuration information of the first channel, the configuration information of the first channel comprising the K1 sub-bands.

According to one aspect of the present disclosure, the above method is characterized in comprising:
  transmitting first information;
  herein, the first information is used to determine K priorities corresponding to the K sub-bands, and the second control information block occupies a first sub-band, the first sub-band being a sub-band of highest priority among the K1 sub-bands.

According to one aspect of the present disclosure, the above method is characterized in comprising:
  transmitting a second signaling and a second radio signal;
  herein, the second signaling is used for determining at least one of a time-domain resource occupied by the second radio signal or a frequency-domain resource occupied by the second radio signal; the second control information block is used for determining whether the second radio signal is correctly received.

According to one aspect of the present disclosure, the above method is characterized in comprising:
  transmitting a first reference signal;
  herein, the first reference signal is used for determining the second control information block.

The present disclosure provides a first node for wireless communications, comprising:
  a first receiver, performing channel listening to determine that K1 sub-bands out of K sub-bands are idle;

a first transmitter, transmitting a first control information block and a second control information block on a first channel;

herein, the first channel occupies the K1 sub-bands of the K sub-bands; K1 repetitions of the first control information block are respectively transmitted by the K1 sub-bands, while the second control information block is transmitted only once on the first channel; the first control information block is used to indicate a sub-band occupied by the second control information block; mapping of the second control information block in a sub-band is unrelated to K1; K is a positive integer greater than 1, and K1 is a positive integer greater than 1 and no greater than K.

The present disclosure provides a second node for wireless communications, comprising:

a second receiver, detecting a first control information block and a second control information block on K sub-bands;

herein, the first channel occupies K1 sub-bands of the K sub-bands; K1 repetitions of the first control information block are respectively transmitted by the K1 sub-bands, while the second control information block is transmitted only once on the first channel; the first control information block is used to indicate a sub-band occupied by the second control information block; a transmitter of the first control information block is a first node, and the first node performs channel listening to determine that the K1 sub-bands out of the K sub-bands are idle; mapping of the second control information block in a sub-band is unrelated to K1; K is a positive integer greater than 1, and K1 is a positive integer greater than 1 and no greater than K.

In one embodiment, the present disclosure is advantageous over the prior art in the following aspects:

- splitting UCI into a first control information block and a second control information block, wherein the first control information block has higher demands on robustness and thus needs to be repeatedly transmitted, while the second control information block is transmitted only once; this practice not only ensures the performance of the first control information block but also avoids excess UCI payload increases.
- indicating a sub-band occupied by the second control information block by the first control information block, and selecting a sub-band for transmitting the second control information block according to the LBT result, thus improving the transmission performance of the second control information block.
- the design in the present disclosure does not relate to recoding and remapping of resources on UCI according to the LBT result; the first node splits the UCI into a first control information block and a second control information block before transmitting UCI, the first control information block being encoded in a repeated manner, and the second control information block being encoded in a way of merely mapping to a sub-band; since a sub-band occupies fixed frequency-domain resources, neither the mapping of radio signal generated by the first control information block nor the mapping of the radio signal generated by the second control information block is related to K1, that is, the LBT result, thus not causing too much enhancement in the implementation complexity of the first node.
- based on receiving performances having been counted, the base station indicating a sub-band with optimal performance for the first node, and advising the first node to select the best-performing sub-band to report the first control information block when LBT is performed on multiple sub-bands, thereby improving the uplink performance.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
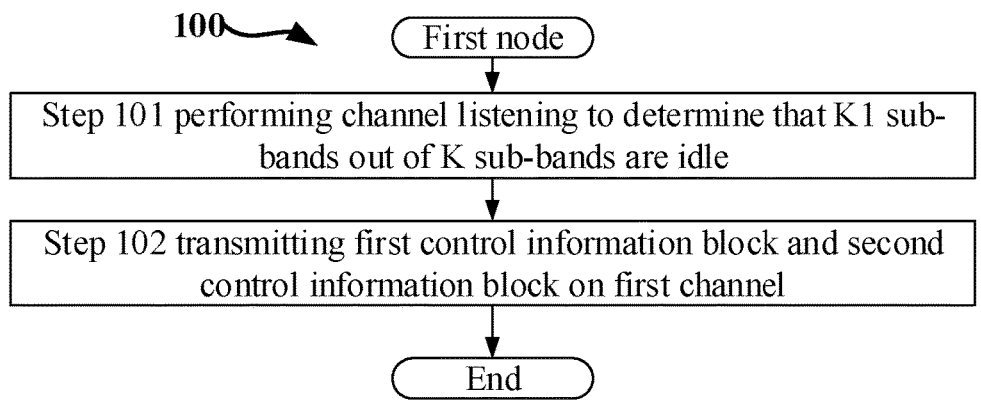
FIG. 1 illustrates a flowchart of processing of a first node according to one embodiment of the present disclosure.

Embodiment 1 illustrates a flowchart of processing of a first node, as shown in FIG. 1. In 100 illustrated by FIG. 1, each box represents a step. In Embodiment 1, a first node in the present disclosure performs channel listening in step 101, to determine that K1 sub-bands out of K sub-bands are idle; and transmits a first control information block and a second control information block on a first channel in step 102.

In Embodiment 1, the first channel occupies the K1 sub-bands of the K sub-bands; K1 repetitions of the first control information block are respectively transmitted by the K1 sub-bands, while the second control information block is transmitted only once on the first channel; the first control information block is used to indicate a sub-band occupied by the second control information block; mapping of the second control information block in a sub-band is unrelated to K1; K is a positive integer greater than 1, and K1 is a positive integer greater than 1 and no greater than K.

In one embodiment, the first listening is Listen Before Talk (LBT).

In one embodiment, the first listening is Clear Channel Assessment (CCA).

In one embodiment, the first listening is for a first frequency-domain interval, the first frequency-domain interval comprising the K sub-bands.

In one embodiment, the first listening is performed in a first frequency-domain interval, the first frequency-domain interval comprising the K sub-bands.

In one embodiment, the K1 sub-bands being idle means that the K1 sub-bands are not occupied by any node other than the first node.

In one embodiment, the K1 sub-bands being idle means that the K1 sub-bands are not occupied by any node other than the second node in the present disclosure.

In one embodiment, the K1 sub-bands being idle means that the K1 sub-bands are not occupied by any node other than the first node.

In one embodiment, the K1 sub-bands being idle means that the K1 sub-bands are not occupied by any node other than the first node and the second node in the present disclosure.

In one embodiment, the K sub-bands all belong to a BWP.

In one embodiment, any of the K sub-bands is a BWP.

In one embodiment, the K sub-bands all belong to a carrier.

In one embodiment, any of the K sub-bands is a carrier.

In one embodiment, the K sub-bands all belong to a Component Carrier (CC).

In one embodiment, any of the K sub-bands is a CC.

In one embodiment, the K sub-bands all belong to a frequency-domain resource deployed by a serving cell.

In one embodiment, any of the K sub-bands is a frequency-domain resource deployed by a serving cell.

In one embodiment, the first channel is reserved for transmission of a data channel.

In one embodiment, a physical layer channel occupied by the first channel is a Physical Uplink Shared Channel (PUSCH).

In one embodiment, a transport channel occupied by the first channel is an Uplink Shared Channel (UL-SCH).

In one embodiment, the first control information block is UCI.

In one embodiment, the first control information block is invisible on a higher layer.

In one embodiment, the first control information block is initiated on a physical layer and terminated on the physical layer.

In one embodiment, the second control information block is UCI.

In one embodiment, the second control information block is invisible on a higher layer.

In one embodiment, the second control information block is initiated on a physical layer and terminated on the physical layer.

In one embodiment, the phrase that K1 repetitions of the first control information block are respectively transmitted by the K1 sub-bands comprises that the first control information block is used for generating a first-type radio signal, and the first-type radio signal is transmitted for K1 times respectively in the K1 sub-bands.

In one embodiment, the phrase that K1 repetitions of the first control information block are respectively transmitted by the K1 sub-bands comprises that the first control information block is used for generating K1 first-type radio sub-signals, and the K1 first-type radio sub-signals are respectively transmitted in the K1 sub-bands, any of the K1 first-type radio sub-signals comprising all information bits comprised in the first control information block.

In one embodiment, the phrase that K1 repetitions of the first control information block are respectively transmitted by the K1 sub-bands comprises that the first control information block is replicated to be K1 information blocks, and the K1 information blocks are respectively used for generating K1 first-type radio sub-signals, the K1 first-type radio sub-signals being respectively transmitted in the K1 sub-bands.

In one embodiment, the phrase that the first control information block is used to indicate a sub-band occupied by the second control information block comprises that the second control information block is transmitted on K2 sub-bands of the K1 sub-bands, K2 being a positive integer greater than 1 and less than K1, and the first control information block is used to indicate the K2 sub-bands.

In one embodiment, the phrase that the first control information block is used to indicate a sub-band occupied by the second control information block comprises that the second control information block is transmitted on one of the K1 sub-bands, and the first control information block is used to indicate the sub-band transmitting the second control information block.

In one embodiment, the second control information block comprises K2 control information sub-blocks; the K2 control information sub-blocks are respectively transmitted on K2 sub-bands of the K1 sub-bands; K2 is a positive integer greater than 1 and less than K1.

In one embodiment, the second control information block is transmitted on one of the K1 sub-bands.

In one embodiment, the phrase that mapping of the second control information block in a sub-band is unrelated to K1 means that the second control information block is used for generating a second-type radio sub-signal, the second-type radio sub-signal being transmitted only in a first sub-band of the K1 sub-bands; the second-type radio sub-signal occupies M1 resource elements (REs), with time-frequency positions of the M1 REs in the first sub-band being unrelated to K1; M1 is a positive integer greater than 1.

In one embodiment, the phrase that mapping of the second control information block in a sub-band is unrelated to K1 means that the second control information block is used for generating a second-type radio signal, the second-type radio signal being transmitted in K2 sub-bands of the K1 sub-bands, and the second-type radio signal being mapped to the K2 sub-bands in an order of firstly in frequency domain, secondly in time domain and finally in sub-bands.

In one embodiment, the phrase that mapping of the second control information block in a sub-band is unrelated to K1 means that the second control information block comprises K2 control information sub-blocks, the K2 control information sub-blocks being respectively transmitted by K2 sub-bands of the K1 sub-bands; K2 is a positive integer greater than 1 and less than K1; the K2 control information sub-blocks are respectively used to generate K2 second-type radio sub-signals, the K2 second-type radio sub-signals being respectively transmitted by the K2 sub-bands; any of the K2 second-type radio sub-signals occupies M2 REs, with time-frequency positions occupied by the M2 REs in a corresponding sub-band being unrelated to K1; M2 is a positive integer greater than 1.

In one embodiment, the channel listening refers to Sub-band LBT, or the channel listening refers to Subband CCA.

In one embodiment, the channel listening refers to Sub-band LBT, or the channel listening refers to Subband CCA.

In one embodiment, the channel listening refers to Wide-band CCA.

In one embodiment, any of the K sub-bands is of a bandwidth no larger than 100 MHz.

In one embodiment, any of the K sub-bands is of a bandwidth of a positive integral multiple of 20 MHz.

In one embodiment, a bandwidth corresponding to the channel listening is a positive integral multiple of 20 MHz.

Embodiment 2

Figure 2:
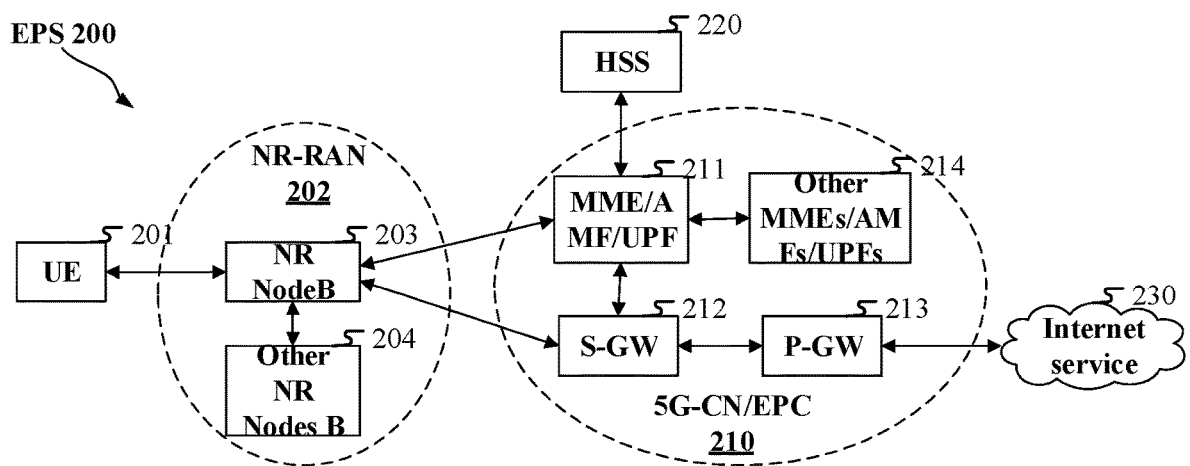
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE), and Long-Term Evolution Advanced (LTE-A) systems. The 5G NR or LTE network architecture 200 may be called an Evolved Packet System (EPS) 200 or other appropriate terms, which may comprise one or more UEs 201, an NG-RAN 202, an Evolved Packet Core/5G Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the first node in the present disclosure.

In one embodiment, the gNB 203 corresponds to the second node in the present disclosure.

In one embodiment, an air interface between the UE 201 and the gNB 203 is a Uu interface.

In one embodiment, a radio link between the UE 201 and the gNB 203 is a cellular link.

In one embodiment, the first node in the present disclosure is the UE 201, and the second node in the present disclosure is the gNB 203.

In one embodiment, the first node in the present disclosure is the gNB 203, and the second node in the present disclosure is the UE 201.

In one embodiment, the UE 201 supports performing LBT on multiple BWPs simultaneously.

In one embodiment, the gNB 203 supports performing LBT on multiple BWPs simultaneously.

In one embodiment, the UE 201 supports performing LBT on multiple sub-bands simultaneously.

In one embodiment, the gNB 203 supports performing LBT on multiple sub-bands simultaneously.

In one embodiment, the UE 201 supports Subband LBT.

In one embodiment, the gNB 203 supports Subband LBT.

In one embodiment, the UE 201 supports Wideband LBT.

In one embodiment, the gNB 203 supports Wideband LBT.

Embodiment 3

Figure 3:
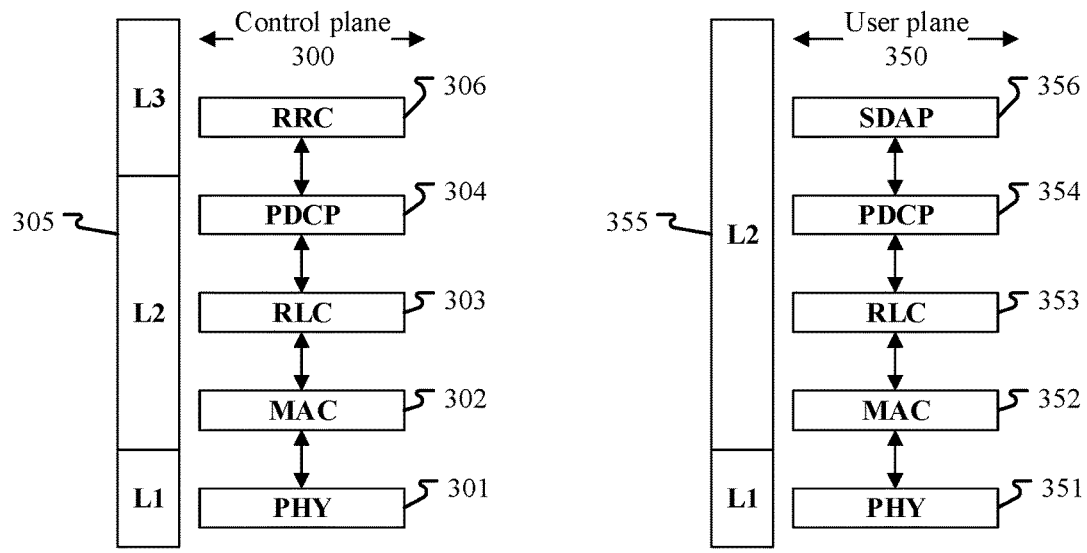
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node or between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first control information block in the present disclosure is generated by the PHY301, or the PHY351.

In one embodiment, the second control information block in the present disclosure is generated by the PHY301, or the PHY351.

In one embodiment, the first control information block in the present disclosure is terminated by the PHY301, or the PHY351.

In one embodiment, the second control information block in the present disclosure is terminated by the PHY301, or the PHY351.

In one embodiment, the first data in the present disclosure is generated by the PHY351, or the PHY301.

In one embodiment, the second data in the present disclosure is generated by the PHY351, or the PHY301.

In one embodiment, the first data in the present disclosure is generated by the MAC352, or the MAC302.

In one embodiment, the second data in the present disclosure is generated by the MAC352, or the MAC302.

In one embodiment, the first signaling in the present disclosure is generated by the PHY301, or the PHY351.

In one embodiment, the first radio signal in the present disclosure is generated by the PHY301, or the PHY351.

In one embodiment, the first radio signal in the present disclosure is generated by the MAC302, or the MAC352.

In one embodiment, the first signaling in the present disclosure is generated by the PHY301, or the PHY351.

In one embodiment, the first information in the present disclosure is generated by the MAC352, or the MAC302.

In one embodiment, the first information in the present disclosure is generated by the RRC306.

In one embodiment, the second signaling in the present disclosure is generated by the PHY301, or the PHY351.

In one embodiment, the second radio signal in the present disclosure is generated by the PHY301, or the PHY351.

In one embodiment, the second radio signal in the present disclosure is generated by the MAC302, or the MAC352.

Embodiment 4

Figure 4:
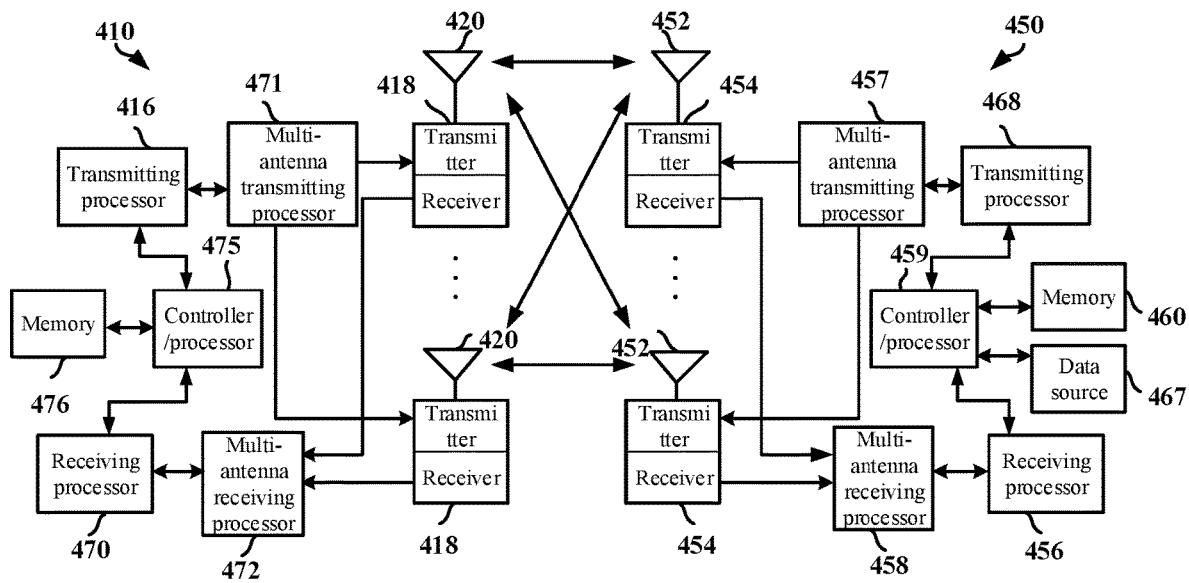
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 implements the functionality of the L2 layer. In the transmission from the second communication device 410 to the first communication device 450, the controller/processor 475 provides header compression, encryption, packet segmentation and reordering, multiplexing between a logical channel and a transport channel and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, including codebook-based precoding and non-codebook-based precoding, and beamforming processing on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to antennas 420.

In a transmission from the second communication device 410 to the first communication device 450, at the first communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the second communication device 410 to the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including codebook-based precoding and non-codebook-based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least performs channel listening to determine that K1 sub-bands out of K sub-bands are idle; and transmits a first control information block and a second control information block on a first channel; the first channel occupies the K1 sub-bands of the K sub-bands; K1 repetitions of the first control information block are respectively transmitted by the K1 sub-bands, while the second control information block is transmitted only once on the first channel; the first control information block is used to indicate a sub-band occupied by the second control information block; mapping of the second control information block in a sub-band is unrelated to K1; K is a positive integer greater than 1, and K1 is a positive integer greater than 1 and no greater than K.

In one embodiment, the first communication device 450 comprises a memory that stores a computer readable instruction program. The computer readable instruction program generates actions when executed by at least one processor. The actions include: performing channel listening to determine that K1 sub-bands out of K sub-bands are idle; and transmitting a first control information block and a second control information block on a first channel; the first channel occupies the K1 sub-bands of the K sub-bands; K1 repetitions of the first control information block are respectively transmitted by the K1 sub-bands, while the second control information block is transmitted only once on the first channel; the first control information block is used to indicate a sub-band occupied by the second control information block; mapping of the second control information block in a sub-band is unrelated to K1; K is a positive integer greater than 1, and K1 is a positive integer greater than 1 and no greater than K.

In one embodiment, the second communication device 410 comprises at least one processor and at least one memory. The at least one memory comprises computer program codes. The at least one memory and the computer program codes are configured to be used in collaboration with the at least one processor. The second communication device 410 at least detects a first control information block and a second control information block on K sub-bands; the first channel occupies K1 sub-bands of the K sub-bands; K1 repetitions of the first control information block are respectively transmitted by the K1 sub-bands, while the second control information block is transmitted only once on the first channel; the first control information block is used to indicate a sub-band occupied by the second control information block; a transmitter of the first control information block is a first node, and the first node performs channel listening to determine that the K1 sub-bands out of the K sub-bands are idle; mapping of the second control information block in a sub-band is unrelated to K1; K is a positive integer greater than 1, and K1 is a positive integer greater than 1 and no greater than K.

In one embodiment, the second communication device 410 comprises a memory that stores a computer readable instruction program. The computer readable instruction program generates an action when executed by at least one processor. The action includes: detecting a first control information block and a second control information block on K sub-bands; the first channel occupies K1 sub-bands of the K sub-bands; K1 repetitions of the first control information block are respectively transmitted by the K1 sub-bands, while the second control information block is transmitted only once on the first channel; the first control information block is used to indicate a sub-band occupied by the second control information block; a transmitter of the first control information block is a first node, and the first node performs channel listening to determine that the K1 sub-bands out of the K sub-bands are idle; mapping of the second control information block in a sub-band is unrelated to K1; K is a positive integer greater than 1, and K1 is a positive integer greater than 1 and no greater than K.

In one embodiment, the first communication device 450 corresponds to the first node in the present disclosure.

In one embodiment, the second communication node 410 corresponds to the second node in the present disclosure.

In one embodiment, the first communication node 450 is a UE.

In one embodiment, the second communication node 410 is a base station.

In one embodiment, at least one of the antenna 452, the receiver 454, the multi-antenna receiving processor 458, the receiving processor 456 or the controller/processor 459 is used for performing channel listening to determine that K1 sub-bands out of K sub-bands are idle.

In one embodiment, at least one of the antenna 452, the transmitter 454, the multi-antenna transmitting processor 457, the transmitting processor 468 or the controller/processor 459 is used for transmitting a first control information block and a second control information block on a first channel; at least one of the antenna 420, the receiver 418, the multi-antenna receiving processor 472, the receiving processor 470 or the controller/processor 475 is used for detecting a first control information block and a second control information block on K sub-bands.

In one embodiment, at least one of the antenna 452, the transmitter 454, the multi-antenna transmitting processor 457, the transmitting processor 468 or the controller/processor 459 is used for transmitting first data on the first channel; at least one of the antenna 420, the receiver 418, the multi-antenna receiving processor 472, the receiving processor 470 or the controller/processor 475 is used for detecting first data on the K sub-bands.

In one embodiment, at least one of the antenna 452, the transmitter 454, the multi-antenna transmitting processor 457, the transmitting processor 468 or the controller/processor 459 is used for transmitting second data on the first channel; at least one of the antenna 420, the receiver 418, the multi-antenna receiving processor 472, the receiving processor 470 or the controller/processor 475 is used for detecting second data on the K sub-bands.

In one embodiment, at least one of the antenna 452, the receiver 454, the multi-antenna receiving processor 458, the receiving processor 456 or the controller/processor 459 is used for receiving a first signaling; at least one of the antenna 420, the transmitter 418, the multi-antenna transmitting processor 471, the transmitting processor 416 or the controller/processor 475 is used for transmitting a first signaling.

In one embodiment, at least one of the antenna 452, the receiver 454, the multi-antenna receiving processor 458, the receiving processor 456 or the controller/processor 459 is used for receiving first information; at least one of the antenna 420, the transmitter 418, the multi-antenna transmitting processor 471, the transmitting processor 416 or the controller/processor 475 is used for transmitting first information.

In one embodiment, at least one of the antenna 452, the receiver 454, the multi-antenna receiving processor 458, the receiving processor 456 or the controller/processor 459 is used for receiving a second signaling and a second radio signal; at least one of the antenna 420, the transmitter 418, the multi-antenna transmitting processor 471, the transmitting processor 416 or the controller/processor 475 is used for transmitting a second signaling and a second radio signal.

In one embodiment, at least one of the antenna 452, the receiver 454, the multi-antenna receiving processor 458, the receiving processor 456 or the controller/processor 459 is used for receiving a first reference signal; at least one of the antenna 420, the transmitter 418, the multi-antenna transmitting processor 471, the transmitting processor 416 or the controller/processor 475 is used for transmitting a first reference signal.

Embodiment 5

Figure 5:
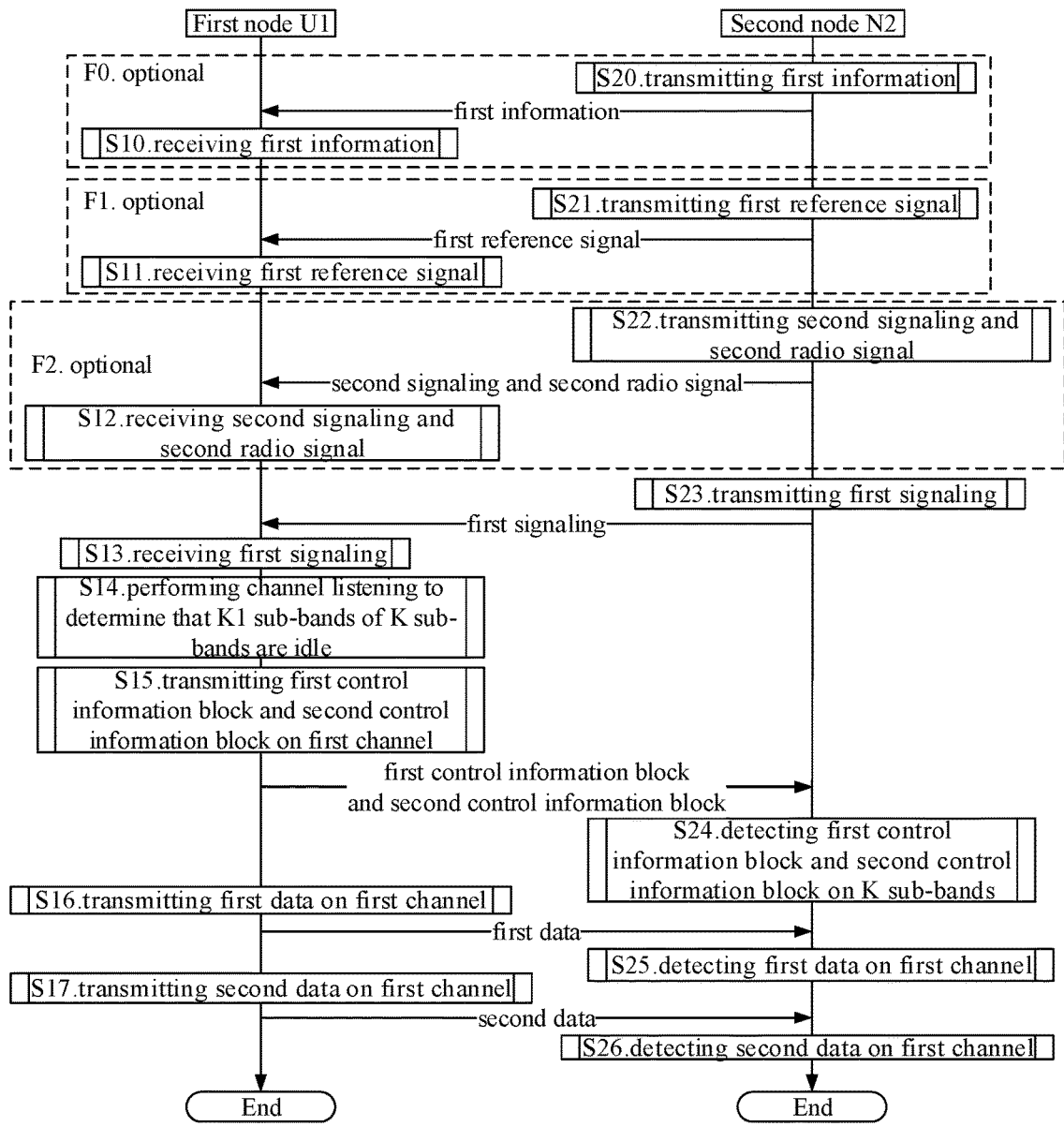
FIG. 5 illustrates a flowchart of a first control information block according to one embodiment of the present disclosure.

Embodiment 5 illustrates a flowchart of a first control information block, as shown in FIG. 5. In FIG. 5, a first node U1 and a second node N2 are in communication via an air interface. The steps marked by F0 and F2 in this figure are optional, respectively.

The first node U1 receives first information in step S10; receives a first reference signal in step S11; and receives a second signaling and a second radio signal in step S12; receives a first signaling in step S13; and performs channel listening in step S14 to determine that K1 sub-bands of the K sub-bands are idle; transmits a first control information block and a second control information block on a first channel in step S15; transmits first data on the first channel in step S16; and transmits second data on the first channel in step S17.

The second node N2 transmits first information in step S20; transmits a first reference signal in step S21; and transmits a second signaling and a second radio signal in step S22; transmits a first signaling in step S23; and detects a first control information block and a second control information block on K sub-bands in step S24; detects first data on the K sub-bands in step S25; and detects second data on the K sub-bands in step S26.

In Embodiment 5, the first channel occupies the K1 sub-bands of the K sub-bands; K1 repetitions of the first control information block are respectively transmitted by the K1 sub-bands, while the second control information block is transmitted only once on the first channel; the first control information block is used to indicate a sub-band occupied by the second control information block; mapping of the second control information block in a sub-band is unrelated to K1; K is a positive integer greater than 1, and K1 is a positive integer greater than 1 and no greater than K; the second control information block and the first data occupy a same sub-band, and mapping of the first data in a sub-band is unrelated to K1; the second data occupies each sub-band among the K1 sub-bands other than the sub-band occupied by the second control information block, and mapping of the second data in a sub-band is unrelated to K1; the first signaling is used to indicate configuration information of the first channel, the configuration information of the first channel comprising the K1 sub-bands; the first information is used to determine K priorities corresponding to the K sub-bands, and the second control information block occupies a first sub-band, the first sub-band being a sub-band of highest priority among the K1 sub-bands; the second signaling is used for determining at least one of a time-domain resource occupied by the second radio signal or a frequency-domain resource occupied by the second radio signal; the second control information block is used for determining whether the second radio signal is correctly received; the first reference signal is used for determining the second control information block.

In one embodiment, a first Transmission Block (TB) comprises K Code Block Groups (CBGs), and the first data is one of the K CBGs.

In one embodiment, the phrase that mapping of the first data in a sub-band is unrelated to K1 comprises that a frequency-domain position of a frequency-domain resource occupied by the first data in an occupied sub-band is indicated by the first signaling in the present disclosure, the frequency-domain position of the occupied frequency-domain resource being unrelated to K1.

In one embodiment, the phrase that mapping of the first data in a sub-band is unrelated to K1 comprises that a sub-band occupied by the second control information block and the first data is the first sub-band in the present disclosure, the first data occupies a first frequency-domain resource set in the first sub-band, and the first signaling in the present disclosure is used to determine K frequency-domain resource sets in the K sub-bands, the first frequency-domain resource set being one of the K frequency-domain resource sets that is located in the first sub-band; positions of the K frequency-domain resource sets in the K sub-bands are unrelated to the K1.

In one embodiment, the phrase that mapping of the first data in a sub-band is unrelated to K1 comprises that the positions of REs occupied by the first data in an occupied sub-band is unrelated to K1.

In one embodiment, the first data is part of data carried by a PUSCH.

In one embodiment, a physical layer channel occupied by the first data is a PUSCH.

In one embodiment, a transmission layer channel occupied by the first data is a UL-SCH.

In one embodiment, a first TB comprises K CBGs, and the first data in the present disclosure is one of the K CBGs, and the second data in the present disclosure is a (K−1)-th CBG among the K CBGs other than a CBG corresponding to the first data.

In one embodiment, a first TB comprises 2 CBGs, the first data in the present disclosure is one of the 2 CBGs, and the second data in the present disclosure is the other of the 2 CBGs.

In one embodiment, the phrase that mapping of the second data in a sub-band is unrelated to K1 comprises that the second control information block occupies a first sub-band of the K1 sub-bands, while the second data occupies K3 sub-band(s) of the K1 sub-bands other than the first sub-band, K3 being equal to a difference between K1 and 1; a frequency-domain position of a frequency-domain resource occupied by the second data in the K3 sub-bands is indicated by the first signaling in the present disclosure, and a frequency-domain position of the frequency-domain resource occupied by the first data is unrelated to K1.

In one embodiment, the phrase that mapping of the second data in a sub-band is unrelated to K1 comprises that the second control information block occupies K2 sub-bands of the K1 sub-bands, while the second data occupies K3 sub-band(s) of the K1 sub-bands other than the K2 sub-bands, K3 being equal to a difference between K1 and K3; a frequency-domain position of a frequency-domain resource occupied by the second data in the K3 sub-bands is indicated by the first signaling in the present disclosure, and a frequency-domain position of the frequency-domain resource occupied by the first data is unrelated to K1.

In one embodiment, the phrase that mapping of the second data in a sub-band is unrelated to K1 comprises that the second control information block occupies a first sub-band of the K1 sub-bands, while the second data occupies K3 sub-band(s) of the K1 sub-bands other than the first sub-band, K3 being equal to a difference between K1 and 1; the second data occupies K3 candidate frequency-domain resource set(s) respectively in the K3 sub-band(s), the K3 candidate frequency-domain resource set(s) being among K frequency-domain resource sets, the K frequency-domain resource sets are respectively located in the K sub-bands, and the first signaling in the present disclosure is used for determining K frequency-domain resource sets from the K sub-bands; positions of the K frequency-domain resource sets in the corresponding K sub-bands are unrelated to K1.

In one embodiment, the phrase that mapping of the second data in a sub-band is unrelated to K1 comprises that the second control information block occupies K2 sub-bands of the K1 sub-bands, while the second data occupies K3 sub-band(s) of the K1 sub-bands other than the K2 sub-bands, K3 being equal to a difference between K1 and K2; K2 is a positive integer less than K1, and K3 is a positive integer; the second data occupies K3 candidate frequency-domain resource set(s) respectively in the K3 sub-band(s), the K3 candidate frequency-domain resource set(s) being among K frequency-domain resource sets, the K frequency-domain resource sets are respectively located in the K sub-bands, and the first signaling in the present disclosure is used for determining K frequency-domain resource sets from the K sub-bands; positions of the K frequency-domain resource sets in the corresponding K sub-bands are unrelated to K1.

In one embodiment, the phrase that mapping of the second data in a sub-band is unrelated to K1 comprises that the positions of REs occupied by the second data in an occupied sub-band are unrelated to K1.

In one embodiment, the second data is part of data carried by a PUSCH.

In one embodiment, a physical layer channel occupied by the second data is a PUSCH.

In one embodiment, a transmission layer channel occupied by the second data is a UL-SCH.

In one embodiment, the first data and the second data in the present disclosure constitute a PUSCH transmitted by the first node U1.

In one embodiment, the first signaling is Downlink Control Information (DCI).

In one embodiment, the first signaling is UL Grant.

In one embodiment, a first bit block comprises the first data and the second data in the present disclosure.

In one embodiment, a first bit block is used for generating the first TB in the present disclosure.

In one subembodiment of the above two embodiments, the first signaling is used for indicating a Modulation and Coding Scheme (MCS) employed by a radio signal generated by the first bit block.

In one subembodiment of the above two embodiments, the first signaling is used for indicating a Hybrid Automatic Repeat reQuest (HARQ) process number corresponding to a radio signal generated by the first bit block.

In one subembodiment of the above two embodiments, the first signaling is used for indicating a Redundancy Version (RV) corresponding to a radio signal generated by the first bit block.

In one subembodiment of the above two embodiments, the first signaling is used for indicating a New Data Indicator (NDI) corresponding to a radio signal generated by the first bit block.

In one embodiment, the first signaling is not used for indicating the K1 sub-bands out of the K sub-bands.

In one embodiment, the first signaling is used for indicating the K sub-bands.

In one embodiment, the phrase of the configuration information of the first channel comprising the K1 sub-bands means that the configuration information is applied in the K1 sub-bands.

In one embodiment, the phrase of the configuration information of the first channel comprising the K1 sub-bands means that the configuration information comprises an MCS, and each data signal transmitted in the first channel employs the MCS.

In one embodiment, the phrase of the configuration information of the first channel comprising the K1 sub-bands means that the configuration information comprises a HARQ process number, and each data signal transmitted in the first channel corresponds to the HARQ process number.

In one embodiment, the phrase of the configuration information of the first channel comprising the K1 sub-bands means that the configuration information comprises a NDI, and each data signal transmitted in the first channel employs the NDI.

In one embodiment, the phrase of the configuration information of the first channel comprising the K1 sub-bands means that the first channel occupies K1 RE sets respectively in the K1 sub-bands, and the configuration information is used for indicating at least time-domain positions of the K1 RE sets in the K1 sub-bands or frequency-domain positions of the K1 RE sets in the K1 sub-bands.

In one embodiment, the first information is transmitted through an RRC signaling.

In one embodiment, the first information is transmitted through MAC Control Elements (MAC CE).

In one embodiment, the first information is transmitted through a higher-layer signaling.

In one embodiment, the K sub-bands respectively correspond to K different non-negative integers, and the K different non-negative integers are respectively used to identify the K priorities.

In one subembodiment, a smallest non-negative integer among the K different non-negative integers corresponds to a sub-band of a highest priority.

In one subembodiment, a greatest non-negative integer among the K different non-negative integers corresponds to a sub-band of a highest priority.

In one embodiment, the second signaling is DCI.

In one embodiment, the second signaling is DL Grant.

In one embodiment, a physical layer channel occupied by the second radio signal is a Physical Downlink Shared Channel (PDSCH).

In one embodiment, a transport channel occupied by the second radio signal is a Downlink Shared Channel (DL-SCH).

In one embodiment, the first reference signal is a Channel State Information Reference Signal (CSI-RS).

In one embodiment, the second control information block comprises Channel State Information (CSI) generated according to the first reference signal.

In one embodiment, the phrase of detecting a first control information block and a second control information block on K sub-bands means that before detecting the first control information block the second node N2 is not aware of which sub-bands of the K sub-bands are the K1 sub-bands.

In one embodiment, the phrase of detecting a first control information block and a second control information block on K sub-bands means that the second node N2 assumes that K repetitions of the first control information block are respectively transmitted by the K sub-bands.

In one embodiment, the phrase of detecting a first control information block and a second control information block on K sub-bands means that the second node N2 performs blind detection on the first control information block in each of the K sub-bands.

In one embodiment, the phrase of detecting a first control information block and a second control information block on K sub-bands means that the second node N2 performs blind detection on the first control information block in any of the K sub-bands.

In one embodiment, the phrase of detecting a first control information block and a second control information block on K sub-bands means that the second node N2 firstly detects the first control information block in the K sub-bands, and then performs blind detection on the second control information block on a sub-band occupied by the second control information block indicated by the first control information block.

In one embodiment, the detection in the present disclosure includes blind detection.

In one embodiment, the detection in the present disclosure includes sequence detection.

In one embodiment, the detection in the present disclosure includes energy detection.

In one embodiment, the detection in the present disclosure includes coherent detection.

In one embodiment, the detection in the present disclosure includes receiving.

In one embodiment, the detection in the present disclosure includes decoding.

In one embodiment, the detection in the present disclosure includes de-modulation.

In one embodiment, the phrase of detecting a first control information block and a second control information block on K sub-bands means that the second node N2 is not aware of which REs are occupied by a radio signal generated by the first control information block or which REs are occupied by a radio signal generated by the second control information block before detecting the radio signal generated by the first control information block and the radio signal generated by the second control information block.

In one embodiment, the phrase of detecting a first control information block and a second control information block on K sub-bands means that the second node N2 determines whether the first control information block is correctly received according to Cyclic Redundancy Check (CRC) carried in a radio signal generated by the first control information block, and the second node N2 determines whether the second control information block is correctly received according to CRC carried in a radio signal generated by the first control information block.

In one embodiment, the phrase of detecting a first control information block and a second control information block on K sub-bands means that the second node N2 determines which REs are occupied by a radio signal generated by the first control information block through energy detection, and the second node N2 determines which REs are occupied by a radio signal generated by the second control information block through energy detection.

In one embodiment, the phrase of detecting a first control information block and a second control information block on K sub-bands means that the second node N2 determines which REs are occupied by a radio signal generated by the first control information block through coherent detection, and the second node N2 determines which REs are occupied by a radio signal generated by the second control information block through coherent detection.

In one embodiment, the phrase of detecting a first control information block and a second control information block on K sub-bands means that the second node N2 determines which REs are occupied by a radio signal generated by the first control information block through sequence detection, and the second node N2 determines which REs are occupied by a radio signal generated by the second control information block through sequence detection.

In one embodiment, the phrase of detecting a first control information block and a second control information block on K sub-bands means that the second node N2 determines whether the first control information block is correctly received through sequence detection, and the second node N2 determines whether the second control information block is correctly received through sequence detection.

In one embodiment, the second node N2 is not aware of which sub-bands of the K sub-bands a radio signal generated by the first data occupies before detecting the first data.

In one embodiment, the phrase of detecting first data means that the second node N2 is not aware of which REs are occupied by a radio signal generated by the first data before detecting the radio signal generated by the first data.

In one embodiment, the phrase of detecting first data means that the second node N2 determines whether the first data is correctly received according to CRC carried in a radio signal generated by the first data.

In one embodiment, the phrase of detecting first data means that the second node N2 determines which REs are occupied by a radio signal generated by the first data through energy detection.

In one embodiment, the phrase of detecting first data means that the second node N2 determines which REs are occupied by a radio signal generated by the first data through coherent detection.

In one embodiment, the phrase of detecting first data means that the second node N2 determines which REs are occupied by a radio signal generated by the first data through sequence detection.

In one embodiment, the phrase of detecting first data means that the second node N2 determines whether the first data is correctly received through sequence detection.

In one embodiment, the second node N2 is not aware of which sub-bands of the K sub-bands a radio signal generated by the second data occupies before detecting the second data.

In one embodiment, the phrase of detecting second data means that the second node N2 is not aware of which REs are occupied by a radio signal generated by the second data before detecting the radio signal generated by the second data.

In one embodiment, the phrase of detecting second data means that the second node N2 determines whether the second data is correctly received according to CRC carried in a radio signal generated by the second data.

In one embodiment, the phrase of detecting second data means that the second node N2 determines which REs are occupied by a radio signal generated by the second data through energy detection.

In one embodiment, the phrase of detecting second data means that the second node N2 determines which REs are occupied by a radio signal generated by the second data through coherent detection.

In one embodiment, the phrase of detecting second data means that the second node N2 determines which REs are occupied by a radio signal generated by the second data through sequence detection.

In one embodiment, the phrase of detecting second data means that the second node N2 determines whether the second data is correctly received through sequence detection.

In one embodiment, the first control information block and the second control information block are transmitted in a same slot.

In one embodiment, the first data and the second data are transmitted in a same slot.

In one embodiment, the second control information block and the first data are transmitted in a same slot.

In one embodiment, the K1 sub-bands respectively correspond to K1 ServCellIndexes, and the first sub-band is one of the K1 sub-bands that corresponds to a minimum ServCellIndex.

Embodiment 6

Figure 6:
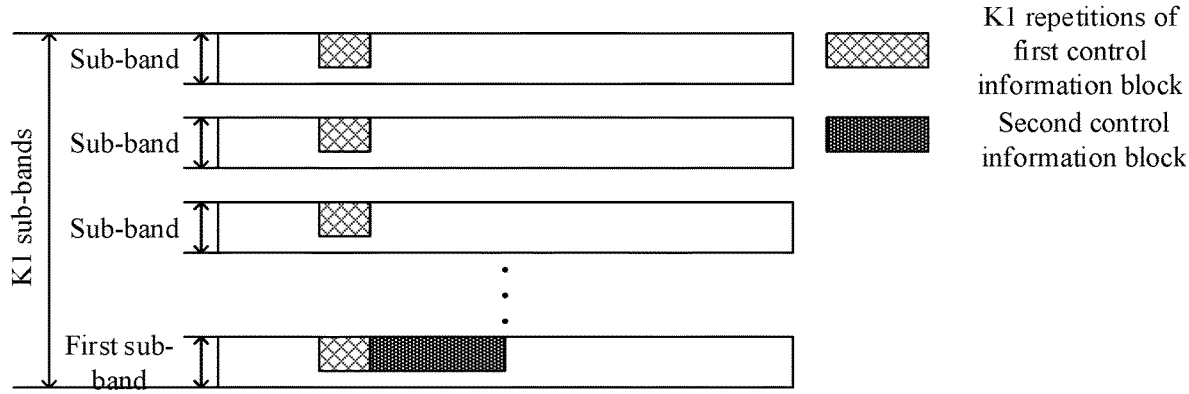
FIG. 6 illustrates a schematic diagram of a first control information block and a second control information block according to one embodiment of the present disclosure.

Embodiment 6 illustrates a schematic diagram of a first control information block and a second control information block, as shown in FIG. 6. In FIG. 6, K1 repetitions of the first control information block are respectively transmitted by K1 sub-bands illustrated in FIG. 6, while the second control information block is transmitted only on a first sub-band of the K1 sub-bands illustrated in FIG. 6.

In one embodiment, frequency-domain resources occupied by the K1 sub-bands are contiguous.

In one embodiment, there are at least two sub-bands among the K1 sub-bands that occupy discrete frequency-domain resources.

In one embodiment, any of K1 repetitions of the first control information block is used to indicate the first sub-band.

In one subembodiment, the said repetition is used to indicate the first sub-band out of the K sub-bands.

In one embodiment, the first control information block comprises K4 information bits, the K4 information bits being used to indicate the first sub-band.

In one subembodiment, K4 is a minimum integer no less than $\log_2(K1)$.

In one embodiment, a position of a frequency-domain resource occupied by any of the K1 repetitions in a corresponding sub-band is the same as that of any other one of the K1 repetitions in the corresponding sub-band.

In one embodiment, the K1 repetitions occupy a same OFDM symbol in time domain.

Embodiment 7

Figure 7:
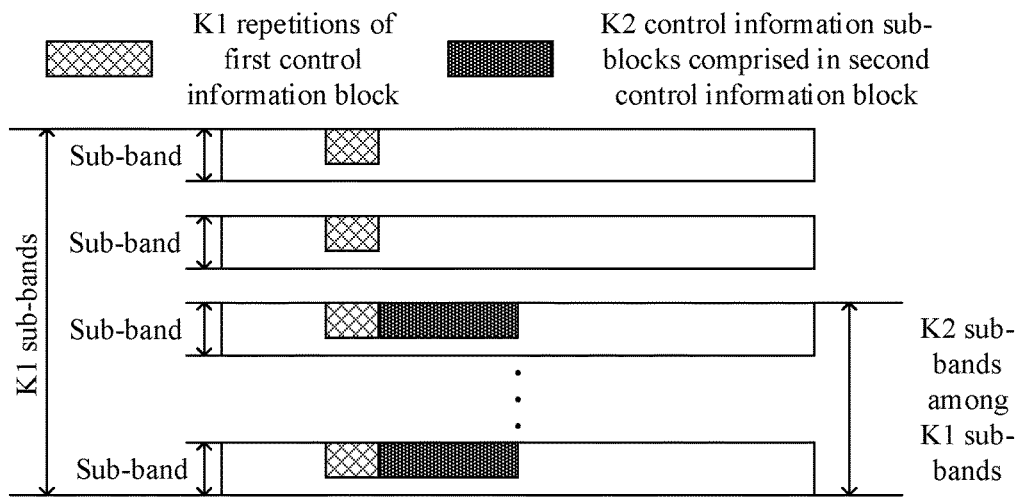
FIG. 7 illustrates a schematic diagram of a first control information block and a second control information block according to another embodiment of the present disclosure.

Embodiment 7 illustrates another schematic diagram of a first control information block and a second control information block, as shown in FIG. 7. In FIG. 7, K1 repetitions of the first control information block are respectively transmitted by K1 sub-bands illustrated in FIG. 7, the second control information block comprises K2 control information sub-blocks, and the K2 control information sub-blocks are respectively transmitted on K2 sub-bands of the K1 sub-bands illustrated herein, K2 being a positive integer greater than 1 and less than K1.

In one embodiment, frequency-domain resources occupied by the K1 sub-bands are contiguous.

In one embodiment, there are at least two sub-bands among the K1 sub-bands that occupy discrete frequency-domain resources.

In one embodiment, any repetition of K1 repetitions of the first control information block is used to indicate the K2 sub-bands of the K1 sub-bands.

In one subembodiment, the said repetition is used to indicate the K2 sub-bands out of the K sub-bands.

In one embodiment, the first control information block comprises K information bits, the K information bits being used to indicate the K2 sub-bands out of the K sub-bands.

In one subembodiment, the K information bits make up a bitmap of which the length is K.

In one embodiment, a position of a frequency-domain resource occupied by any of the K1 repetitions in a corresponding sub-band is the same as that of any other one of the K1 repetitions in the corresponding sub-band.

In one embodiment, the K1 repetitions occupy a same OFDM symbol in time domain.

In one embodiment, a position of a frequency-domain resource occupied by any of the K2 control information sub-blocks in a corresponding sub-band is the same as that of any other one of the K2 control information sub-blocks in the corresponding sub-band.

In one embodiment, the K2 control information sub-blocks occupy a same OFDM symbol in time domain.

Embodiment 8

Figure 8:
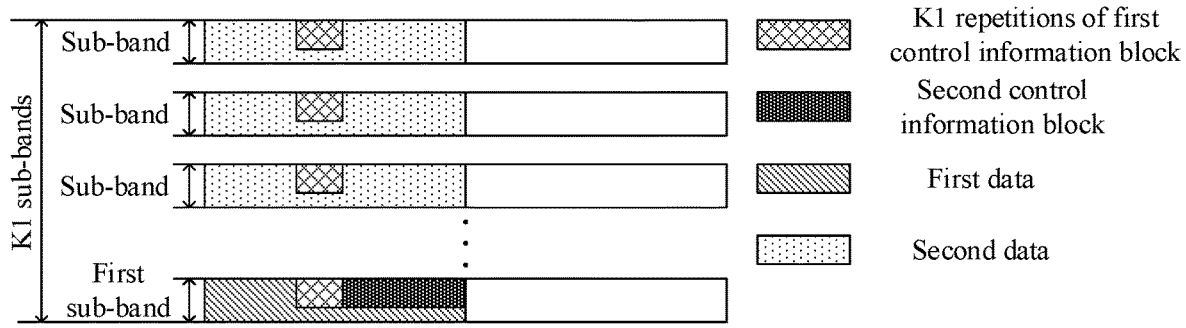
FIG. 8 illustrates a schematic diagram of first data and second data according to one embodiment of the present disclosure.

Embodiment 8 illustrates a schematic diagram of first data and second data, as shown in FIG. 8. In FIG. 8, the first data and the second control information block in the present disclosure both occupy a first sub-band of the K1 sub-bands, while the second data occupies each sub-band among the K1 sub-bands other than the first sub-band.

In one embodiment, the first data comprises a radio signal generated by a Code Block Group (CBG).

In one embodiment, the first data comprises (a) radio signal(s) generated by (K1-1) CBG(s).

In one embodiment, the first data and the second data constitute the first channel in the present disclosure.

In one embodiment, the first data and the second data constitute a TB.

In one embodiment, modulation symbols generated by the second control information block are mapped into modulation symbols generated by the first data through rate matching.

In one embodiment, modulation symbols generated by the second control information block are mapped into modulation symbols generated by the first data through puncturing.

In one embodiment, modulation symbols generated by the first control information block are mapped into modulation symbols generated by the first data through rate matching.

In one embodiment, modulation symbols generated by the first control information block are mapped into modulation symbols generated by the first data through puncturing.

In one embodiment, modulation symbols generated by the first control information block are mapped into modulation symbols generated by the second data through rate matching.

In one embodiment, modulation symbols generated by the first control information block are mapped into modulation symbols generated by the second data through puncturing.

Embodiment 9

Figure 9:
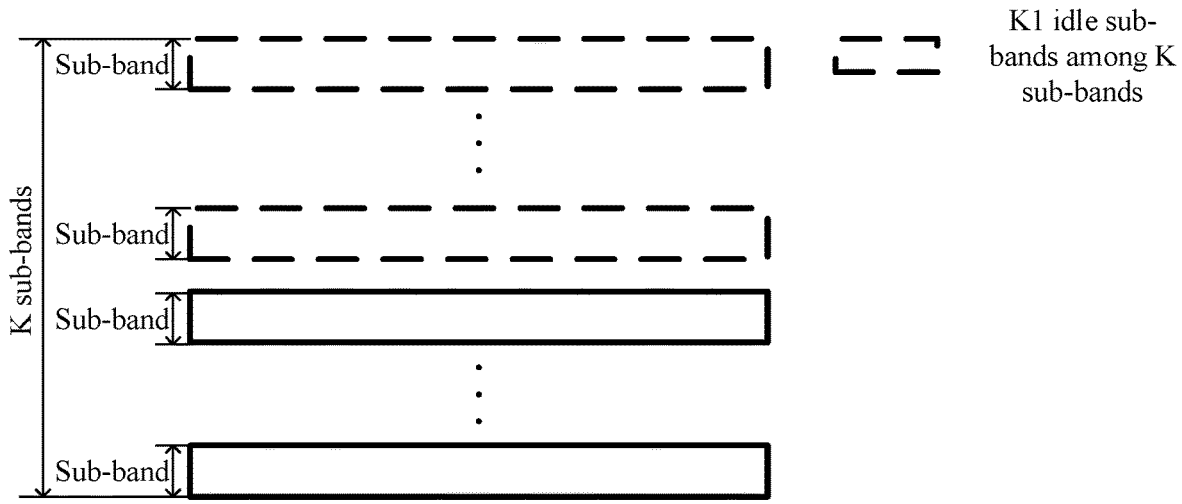
FIG. 9 illustrates a schematic diagram of K sub-bands according to one embodiment of the present disclosure.

Embodiment 9 illustrates a schematic diagram of K sub-bands, as shown in FIG. 9. In FIG. 9, K1 sub-bands out of the K sub-bands are determined to be idle by the first node in the present disclosure.

In one embodiment, the K sub-bands are configured by a higher-layer signaling.

In one embodiment, the K sub-bands are contiguous in frequency domain.

In one embodiment, the K sub-bands are indicated by the first signaling in the present disclosure.

In one embodiment, the K1 sub-bands are contiguous in frequency domain.

Embodiment 10

Figure 10:
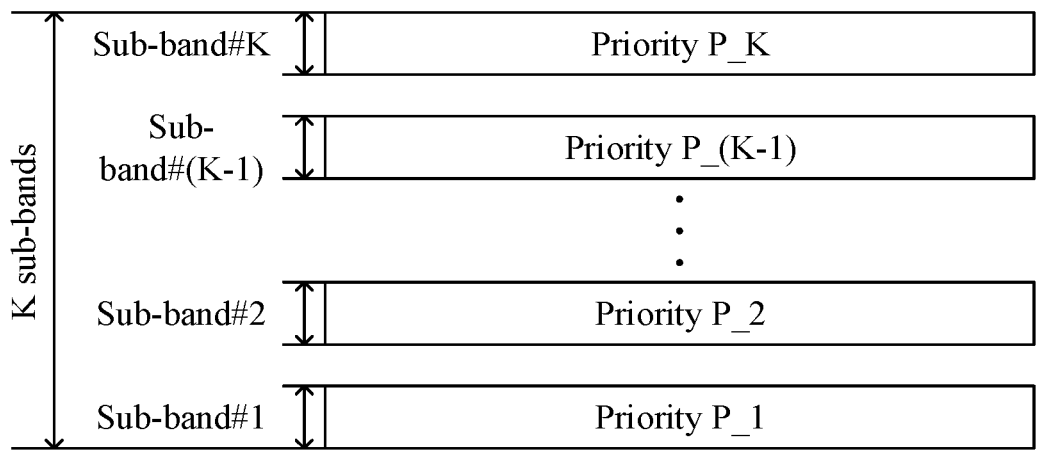
FIG. 10 illustrates a schematic diagram of K priorities corresponding to K sub-bands according to one embodiment of the present disclosure.

Embodiment 10 illustrates a schematic diagram of K priorities corresponding to K sub-bands, as shown in FIG. 10. The K sub-bands correspond to sub-band #1 through sub-band #K illustrated by FIG. 10, the K priorities are from P_1 to P_K, respectively, among which any priority is a non-negative integer.

In one embodiment, a smallest integer from P_1 through P_K corresponds to a highest priority.

In one embodiment, a greatest integer from P_1 through P_K corresponds to a highest priority.

In one embodiment, the first sub-band in the present disclosure is a sub-band corresponding to a highest priority among the K1 sub-bands in the present disclosure.

Embodiment 11

Figure 11:
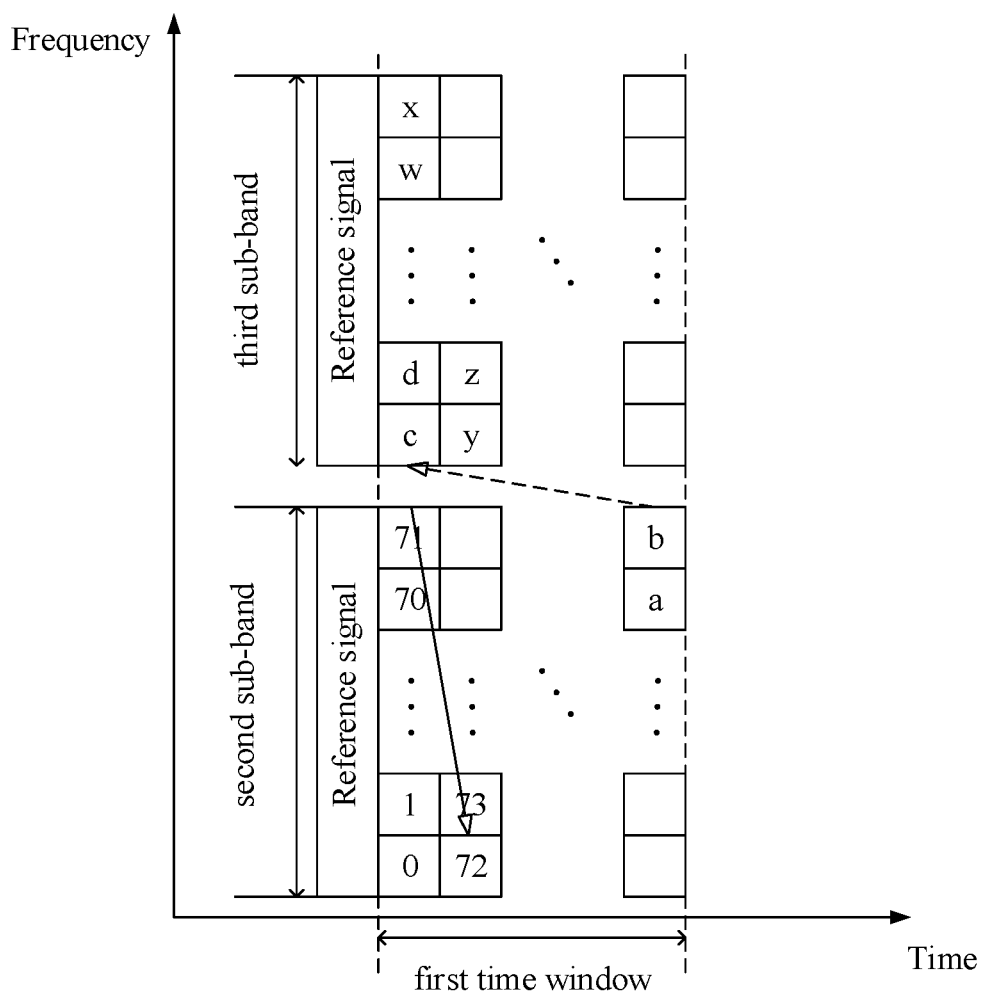
FIG. 11 illustrates a schematic diagram of mapping of a second control information block according to one embodiment of the present disclosure.

Embodiment 11 illustrates a schematic diagram of mapping of a second control information block, as shown in FIG. 11. A second control information block in FIG. 11 is mapped to multiple sub-bands, and the FIG. 11 illustrates the second control information block being mapped onto a second sub-band and a third sub-band; a time-domain resource occupied by a radio signal generated by the second control information block belongs to a first time window; the second control information block herein is mapped in an order of firstly according to frequency domain, secondly according to time domain and finally according to sub-bands; each small box in the figure corresponds to an RE; the second control information block is mapped in a second time-frequency resource set and a third time-frequency resource set, and time-domain resources occupied by the second time-frequency resource set and the third time-frequency resource set belong to the first time window, and frequency-domain resources occupied by the second time-frequency resource set and the third time-frequency resource set respectively belong to a second sub-band and a third sub-band. The letters marking the REs indicate the orders in which the second control information block is respectively mapped in different sub-bands; the second control information block is mapped in an ascending order of numbers and an alphabetical order from a to z; the empty arrowhead with solid end in FIG. 11 represents a mapping order of adjacent OFDM symbols, while the empty arrowhead with broken end in FIG. 11 represent a mapping order of adjacent sub-bands.

In one embodiment, the phrase that the second control information block herein is mapped in an order of firstly according to frequency domain, secondly according to time domain and finally according to sub-bands means that: within an OFDM symbol, modulation symbols generated by the second control information block are mapped in an order from low center frequency point to high center frequency point of subcarriers.

In one embodiment, the phrase that the second control information block herein is mapped in an order of firstly according to frequency domain, secondly according to time domain and finally according to sub-bands means that: upon mapping of an OFDM symbol in a sub-band, the second control information block begins to be mapped in an order of time domain, starting from a subcarrier with a lowest center frequency point on a next OFDM symbol.

In one embodiment, the phrase that the second control information block herein is mapped in an order of firstly according to frequency domain, secondly according to time domain and finally according to sub-bands means that: upon completion of mapping to all REs occupied in a sub-band, the second control information block will be mapped into another sub-band.

In one embodiment, the reference signal shown in FIG. 11 is a Demodulation Reference Signal (DMRS).

In one embodiment, the first time window shown in FIG. 11 lasts no longer than a slot in time domain.

In one embodiment, the first time window shown in FIG. 11 occupies a positive integer number of contiguous OFDM symbols in time domain.

Embodiment 12

Figure 12:
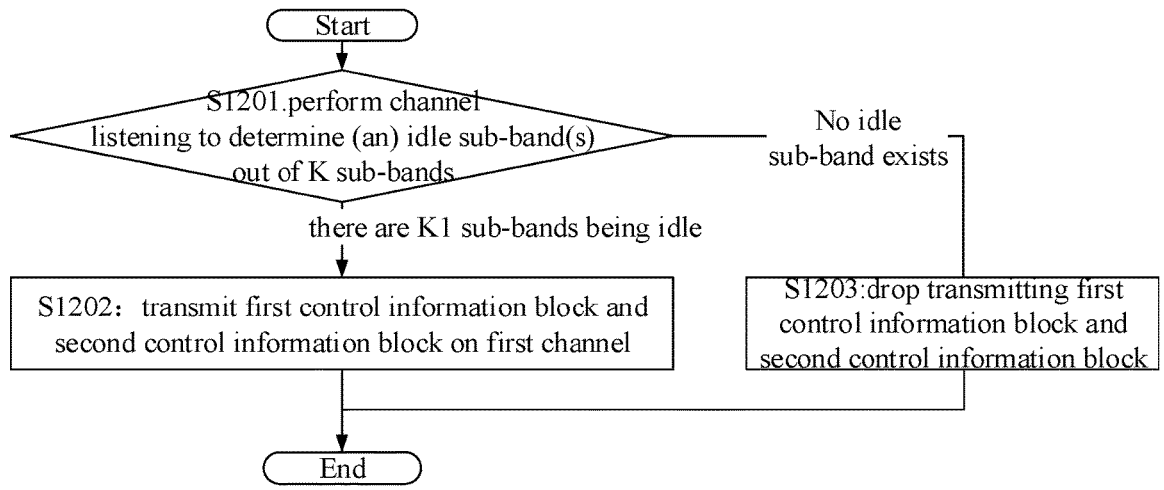
FIG. 12 illustrates a flowchart of channel listening and follow-up operations according to one embodiment of the present disclosure.

Embodiment 12 illustrates a flowchart of channel listening and follow-up operations, as shown in FIG. 12. A first node performs channel listening to determine (an) idle sub-band(s) out of K sub-bands in step S1201; if there are K1 subcarriers being idle, the first node transmits a first control information block and a second control information block on a first channel in step S1202; if no idle subcarrier exists, drops transmitting a first control information block and a second control information block in step S1203.

In one embodiment, the step S1203 comprises: maintaining zero transmitting power on frequency-domain resources occupied on the first channel.

In one embodiment, the step S1203 comprises: buffering the first control information block and the second control information block to wait for a next transmitting occasion.

In one embodiment, the step S1203 comprises: continuing the performance of channel sensing operation to determine time-frequency resources that can be used for transmitting the first control information block and the second control information block.

Embodiment 13

Figure 13:
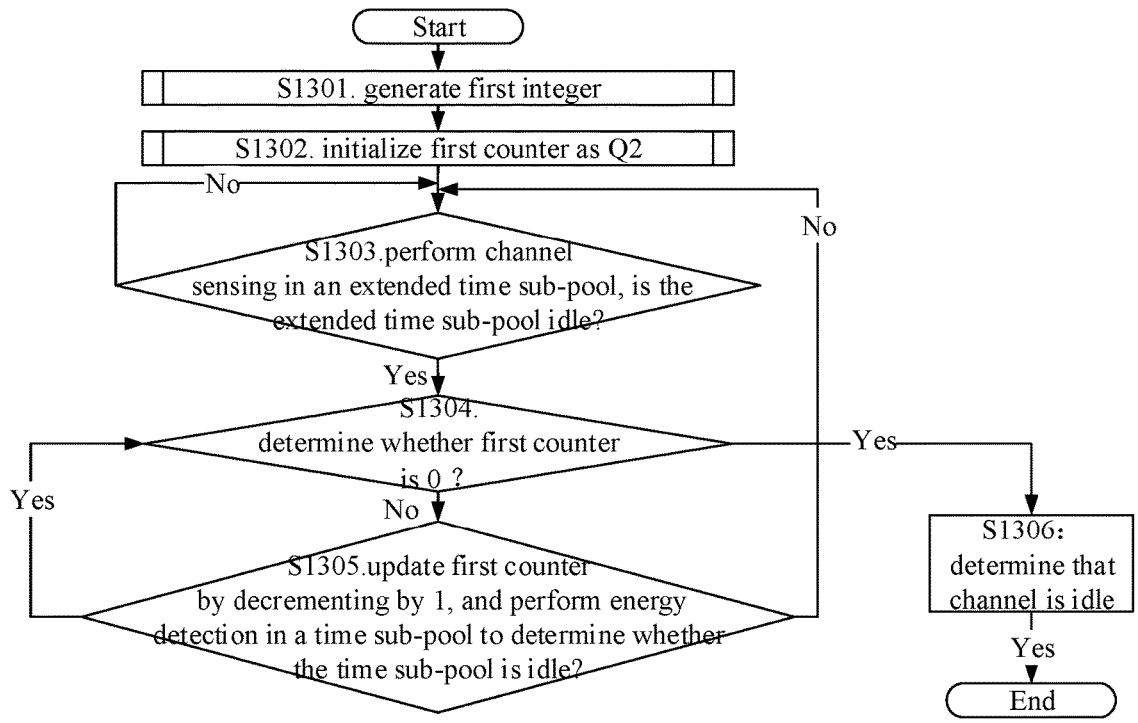
FIG. 13 illustrates a flowchart of performing channel listening to determine whether a sub-band is idle according to one embodiment of the present disclosure.

Embodiment 13 illustrates a flowchart of performing given channel listening to determine whether a given sub-band is idle, as shown in FIG. 13. Steps illustrated by FIG. 13 are the listening performed on a given frequency-domain resource for the purpose of determining whether a channel on the given frequency-domain resource is idle.

The given node in the present disclosure generates a first integer in step S1301; and initializes a first counter as Q2 in step S1302, where the Q2 is distributed at even probability among all integers from 0 to the first integer; performs channel sensing in an extended time sub-pool in step S1303 to determine whether the extended time sub-pool is idle, if not, proceeds channel sensing in an extended time sub-pool till an idle extended time sub-pool is found; if so, determines whether the first counter is 0 in step S1304; if the result of determination in step S1304 is yes, it is determined that the channel is idle in step S1306; if the result of determination in step S1304 is no, updates the first counter by decrementing by 1 (that is, value of first counter after update=value of first counter before update—1) in step S1305, and performs energy detection in a time sub-pool to determine whether the time sub-pool is idle; if the result of determination in step S1305 is yes, go back to the step S1304; if the result of determination in step S1305 is no, go back to step S1303, i.e., performing energy detection till an extended time sub-pool is deemed as idle.

In one embodiment, the given listening is the channel listening in the present disclosure, the given frequency-domain resource comprises any sub-band of the K sub-bands in the present disclosure.

In one embodiment, in the channel sensing performed in a first time sub-pool, a first time sub-pool is deemed to be idle, and the first time sub-pool is an earliest time sub-pool among the Q1 time sub-pools; Q2 is greater than 0; the Q2 time sub-pool(s) is(are) (Q1-1) time sub-pool(s) of the Q1 time sub-pools other than the first time sub-pool.

In one embodiment, the first node performs Q1 energy detections respectively in the Q1 time sub-pools, the Q1 energy detections being used to determine whether the given frequency-domain resource is idle.

In one embodiment, the first node performs Q1 energy detections respectively in the Q1 time sub-pools, the Q1 energy detections being used to determine whether the given frequency-domain resource can be used by the first node for transmitting radio signals.

In one embodiment, the first node performs Q1 energy detections respectively in the Q1 time sub-pools, the Q1 energy detections being energy detections in LBT, the specific definition and implementation mode of LBT are given in 3GPP TS36.889.

In one embodiment, the first node performs Q1 energy detections respectively in the Q1 time sub-pools, the Q1 energy detections being energy detections in CCA, the specific definition and implementation mode of CCA are given in 3GPP TS36.889.

In one embodiment, the first node performs Q1 energy detections respectively in the Q1 time sub-pools, any of the Q1 energy detections being implemented in a way of energy detection in WiFi.

In one embodiment, the first node performs Q1 energy detections respectively in the Q1 time sub-pools, any of the Q1 energy detections being implemented in a way of energy detection in LTE LAA or NR LAA.

In one embodiment, time-domain resources occupied by any of the Q1 time sub-pools are contiguous.

In one embodiment, the Q1 time sub-pools are mutually orthogonal (i.e., non-overlapping) in time domain.

In one embodiment, any of the Q1 time sub-pools lasts 16 µs, or any of the Q1 time sub-pools lasts 9 µs.

In one embodiment, any of the Q1 time sub-pools is Tsl, the Tsl being a slot duration, and the specific definition of the Tsl can be found in 3GPP TS37.213, section 4.

In one embodiment, the channel sensing comprises energy detection.

In one embodiment, the channel sensing comprises coherent detection on a characteristic sequence.

In one embodiment, the channel sensing comprises non-coherent detection on a characteristic sequence.

In one embodiment, Q2 is greater than 1, and the Q2 time sub-pools are of a same duration.

In one embodiment, the duration of any of the Q2 time sub-pools is related to a subcarrier spacing on the given frequency-domain resource.

Embodiment 14

Figure 14:
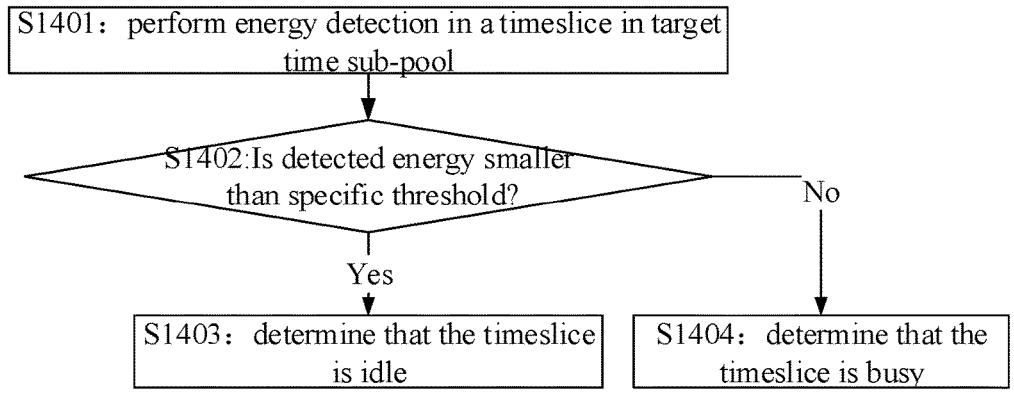
FIG. 14 illustrates a flowchart of performing energy detection in a target time sub-pool according to one embodiment of the present disclosure.

Embodiment 14 illustrates a flowchart of performing energy detection in a target time sub-pool, as shown in FIG. 14. A first node performs energy detection in a timeslice in a target time sub-pool; and determines in step S1402 whether the energy detected is smaller than a specific threshold; if so, determines that the timeslice is idle in step S1403; if no, determines that the timeslice is busy in step S1404.

In one embodiment, the specific threshold is measured in dBm.

In one embodiment, the specific threshold is measured in mW.

In one embodiment, the specific threshold is related to a subcarrier spacing employed in the frequency-domain resource for implementation.

In one embodiment, the specific threshold is configurable.

In one embodiment, the specific threshold is a constant.

In one embodiment, the target time sub-pool comprises multiple continuous timeslices; the steps in FIG. 10 are implemented in each timeslice of the multiple continuous timeslices; if each of the timeslices is idle, the target time sub-pool is deemed to be idle, otherwise, the target time sub-pool is deemed to be busy.

In one subembodiment, the target time sub-pool is a first time sub-pool of the Q1 time sub-pools in the present disclosure.

In one subembodiment, the target time sub-pool is any time sub-pool of the Q1 time sub-pools in the present disclosure.

In one subembodiment, the target time sub-pool is the extended time sub-pool in the present disclosure.

In one subembodiment, the target time sub-pool is the first time sub-pool in the present disclosure.

In one subembodiment, the target time sub-pool lasts 16 µs.

In one subembodiment, the target time sub-pool lasts 9 µs.

In one subembodiment, the timeslice lasts 4 µs.

In one embodiment, the specific threshold is equal to or less than −72 dBm.

Embodiment 15

Figure 15:
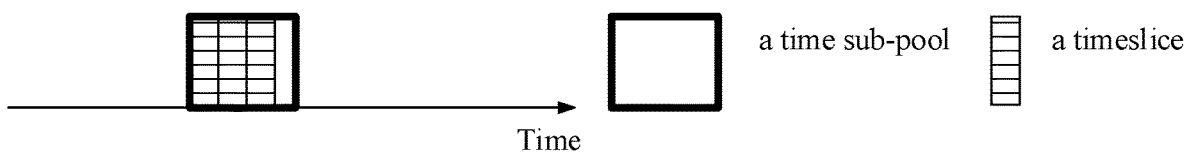
FIG. 15 illustrates a schematic diagram of a time sub-pool according to one embodiment of the present disclosure.

Embodiment 15 illustrates a schematic diagram of a time sub-pool, as shown in FIG. 15. In FIG. 15, a square framed with thick lines represents a time sub-pool, and a square filled with horizontal lines represents a timeslice. The time sub-pool comprises multiple timeslices.

In one embodiment, a duration of the time sub-pool cannot be divisible by a duration of the timeslice, namely, the time sub-pool cannot be exactly divided into a positive integer number of timeslices.

In one embodiment, the time sub-pool is any time sub-pool of the Q1 time sub-pools in the present disclosure.

In one embodiment, the time sub-pool lasts 16 µs.

In one embodiment, the time sub-pool lasts 9 µs.

In one embodiment, the timeslice lasts 4 µs.

Embodiment 16

Figure 16:
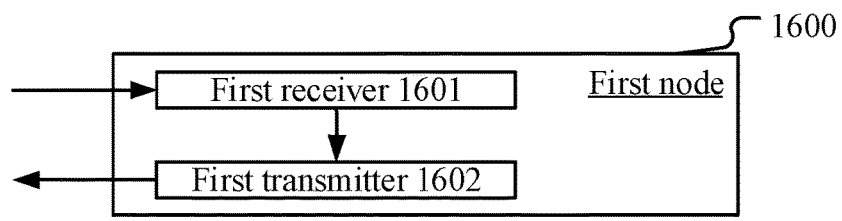
FIG. 16 illustrates a structure block diagram used in a first node according to one embodiment of the present disclosure.

Embodiment 16 illustrates a structure block diagram used in a first node, as shown in FIG. 16. In FIG. 16, a first node 1600 comprises a first receiver 1601 and a first transmitter 1602.

The first receiver 1601 performs channel listening to determine that K1 sub-bands out of K sub-bands are idle;

the first transmitter 1602 transmits a first control information block and a second control information block on a first channel.

In Embodiment 16, the first channel occupies the K1 sub-bands of the K sub-bands; K1 repetitions of the first control information block are respectively transmitted by the K1 sub-bands, while the second control information block is transmitted only once on the first channel; the first control information block is used to indicate a sub-band occupied by the second control information block; mapping of the second control information block in a sub-band is unrelated to K1; K is a positive integer greater than 1, and K1 is a positive integer greater than 1 and no greater than K.

In one embodiment, the first transmitter 1602 transmits first data on the first channel; the second control information block and the first data occupy a same sub-band, and mapping of the first data in a sub-band is unrelated to K1.

In one embodiment, the first transmitter 1602 transmits second data on the first channel; the second data occupies each sub-band among the K1 sub-bands other than the sub-band occupied by the second control information block, and mapping of the second data in a sub-band is unrelated to K1.

In one embodiment, the first receiver 1601 receives a first signaling; the first signaling is used to indicate configuration information of the first channel, the configuration information of the first channel comprising the K1 sub-bands.

In one embodiment, the first receiver 1601 receives first information; the first information is used to determine K priorities corresponding to the K sub-bands, and the second control information block occupies a first sub-band, the first sub-band being a sub-band of highest priority among the K1 sub-bands.

In one embodiment, the first receiver 1601 receives a second signaling and a second radio signal; the second signaling is used for determining at least one of a time-domain resource occupied by the second radio signal or a frequency-domain resource occupied by the second radio signal; the second control information block is used for determining whether the second radio signal is correctly received.

In one embodiment, the first receiver 1601 receives a first reference signal; the first reference signal is used for determining the second control information block.

In one embodiment, the first receiver 1601 comprises at least the first four of the antenna 452, the receiver 454, the multi-antenna receiving processor 458, the receiving processor 456 and the controller/processor 459 in Embodiment 4.

In one embodiment, the first transmitter 1602 comprises at least the first four of the antenna 452, the transmitter 454, the multi-antenna transmitting processor 457, the transmitting processor 468 and the controller/processor 459 in Embodiment 4.

Embodiment 17

Figure 17:
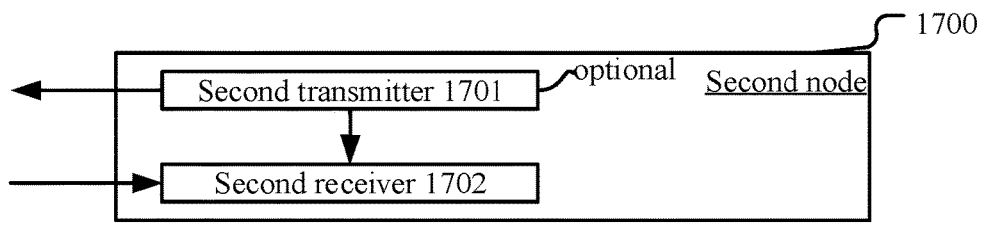
FIG. 17 illustrates a structure block diagram used in a second node according to one embodiment of the present disclosure.

Embodiment 17 illustrates a structure block diagram used in a second node, as shown in FIG. 17. In FIG. 17, a second node 1700 comprises a second transmitter 1701 and a second receiver 1702; herein, the second transmitter 1701 is optional.

The second transmitter 1701 transmits a first signaling;

the second receiver 1702 detects a first control information block and a second control information block on K sub-bands.

In Embodiment 17, the first channel occupies K1 sub-bands of the K sub-bands; K1 repetitions of the first control information block are respectively transmitted by the K1 sub-bands, while the second control information block is transmitted only once on the first channel; the first control information block is used to indicate a sub-band occupied by the second control information block; a transmitter of the first control information block is a first node, and the first node performs channel listening to determine that the K1 sub-bands out of the K sub-bands are idle; mapping of the second control information block in a sub-band is unrelated to K1; K is a positive integer greater than 1, and K1 is a positive integer greater than 1 and no greater than K; the first signaling is used to indicate configuration information of the first channel, the configuration information of the first channel comprising the K1 sub-bands.

In one embodiment, the second receiver 1702 detects first data on the K sub-bands; the second control information block and the first data occupy a same sub-band out of the K1 sub-bands, and mapping of the first data in a sub-band is unrelated to K1.

In one embodiment, the second receiver 1702 detects second data on the K sub-bands; the second data occupies each sub-band among the K1 sub-bands other than the sub-band occupied by the second control information block, and mapping of the second data in a sub-band is unrelated to K1.

In one embodiment, the second transmitter 1701 transmits first information; the first information is used to determine K priorities corresponding to the K sub-bands, and the second control information block occupies a first sub-band, the first sub-band being a sub-band of highest priority among the K1 sub-bands.

In one embodiment, the second transmitter 1701 transmits a second signaling and a second radio signal; the second signaling is used for determining at least one of a time-domain resource occupied by the second radio signal or a frequency-domain resource occupied by the second radio signal; the second control information block is used for determining whether the second radio signal is correctly received.

In one embodiment, the second transmitter 1701 transmits a first reference signal; the first reference signal is used for determining the second control information block.

In one embodiment, the second transmitter 1701 comprises at least the first four of the antenna 420, the transmitter 418, the multi-antenna transmitting processor 471, the transmitting processor 416 and the controller/processor 475 in Embodiment 4.

In one embodiment, the second receiver 1702 comprises at least the first four of the antenna 420, the receiver 418, the multi-antenna receiving processor 472, the receiving processor 470 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node and the second node in the present disclosure include but are not limited to mobile phones, tablet computers, notebooks, network cards, low-consumption equipment, enhanced MTC (eMTC) equipment, NB-IOT terminals, vehicle-mounted equipment, vehicles, automobiles, RSU, aircrafts, airplanes, unmanned aerial vehicles, telecontrolled aircrafts, etc. The base station in the present disclosure includes but is not limited to macro-cellular base stations, micro-cellular base stations, home base stations, relay base station, eNB, gNB, Transmitter Receiver Point (TRP), GNSS, relay satellites, satellite base station, aerial base station, RSU and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, performing channel listening to determine that K1 sub-bands out of K sub-bands are idle;
a first transmitter, transmitting a first control information block and a second control information block on a first channel;
wherein the first channel occupies the K1 sub-bands of the K sub-bands; before transmitting a Uplink Control Information (UCI), the UCI is split into the first control information block and the second control information block, the first control information block is encoded in a repeated manner for K1 repetitions mapping to the K1 sub-bands respectively, while the second control information block is encoded in a way of only mapping to one sub-band; the K1 repetitions of the first control information block are respectively transmitted by the K1 sub-bands, while the second control information block is transmitted only once on the first channel; the first control information block is used to indicate a sub-band occupied by the second control information block; mapping of the second control information block in a sub-band is unrelated to K1; K is a positive integer greater than 1, and K1 is a positive integer greater than 1 and no greater than K; each of the K sub-bands is on a different Bandwidth Part (BWP), or each of the K sub-bands is on a different carrier; each of the K1 repetitions of the first control information block is used to indicate a same first sub-band.

2. The first node according to claim 1, wherein the first transmitter transmits first data on the first channel; the second control information block and the first data occupy a same sub-band, and mapping of the first data in a sub-band is unrelated to K1.

3. The first node according to claim 2, wherein the first transmitter transmits second data on the first channel; the second data occupies each sub-band among the K1 sub-bands other than the sub-band occupied by the second control information block, and mapping of the second data in a sub-band is unrelated to K1.

4. The first node according to claim 1, wherein the first receiver receives a first signaling; the first signaling is used to indicate configuration information of the first channel, the configuration information of the first channel comprising the K1 sub-bands; the first signaling is an Uplink (UL) Grant.

5. The first node according to claim 1, wherein the first receiver receives first information; the first information is used to determine K priorities corresponding to the K sub-bands, and the second control information block occupies a-the first sub-band, the first sub-band being a sub-band of highest priority among the K1 sub-bands.

6. The first node according to claim 1, wherein mapping of the second control information block in a sub-band is unrelated to K1 means includes at least one of:
the second control information block being used to generate a second-type radio sub-signal, the second-type radio sub-signal being transmitted only in the first sub-band of the K1 sub-bands; the second-type radio sub-signal occupying M1 resource elements (REs), with time-frequency positions of the M1 REs in the first sub-band being unrelated to K1; M1 being a positive integer greater than 1;
the second control information block being used to generate a second-type radio signal, the second-type radio signal being transmitted in K2 sub-bands of the K1 sub-bands, and the second-type radio signal being mapped to the K2 sub-bands in an order of firstly in frequency domain, secondly in time domain and finally in sub-bands;
the second control information block comprising K2 control information sub-blocks, the K2 control information sub-blocks being respectively transmitted by K2 sub-bands of the K1 sub-bands; K2 being a positive integer greater than 1 and less than K1; the K2 control information sub-blocks being respectively used to generate K2 second-type radio sub-signals, the K2 second-type radio sub-signals being respectively transmitted by the K2 sub-bands; any of the K2 second-type radio sub-signals occupies M2 REs, with time-frequency positions occupied by the M2 REs in a corresponding sub-band being unrelated to K1; M2 being a positive integer greater than 1.

7. The first node according to claim 3, wherein a first Transport Block (TB) comprises K Code Block Groups (CBGs), the first data is one of the K CBGs, and the second data is (K−1) CBG(s) of the K CBGs other than the CBG corresponding to the first data; or a first TB comprises 2 CBGs, the first data is one of the 2 CBGs, and the second data is the other of the 2 CBGs.

8. The first node according to claim 4, wherein the first signaling is not used to indicate the K1 sub-bands among the K sub-bands, and the first signaling is used to indicate the K sub-bands; the configuration information of the first channel comprising the K1 sub-bands means includes at least one of:
the configuration information being applied in the K1 sub-bands;
the configuration information comprising an Modulation and Coding Scheme (MCS), the MCS being adopted by each data signal transmitted in the first channel;
the configuration information comprising a Hybrid Automatic Repeat Request (HARQ) process identification (ID), the HARQ process ID corresponding to each data signal transmitted in the first channel;
the configuration information comprising an New Data Indicator (NDI), the NDI being adopted by each data signal transmitted in the first channel;
the first channel respectively occupying K1 RE sets in the K1 sub-bands, the configuration information being used to indicate at least time-domain positions of the K1 RE sets in the K1 sub-bands or frequency-domain positions of the K1 RE sets in the K1 sub-bands.

9. A second node for wireless communications, comprising:
a second receiver, detecting a first control information block and a second control information block on K sub-bands;
wherein the first channel occupies the K1 sub-bands of the K sub-bands; a Uplink Control Information (UCI) is split into the first control information block and the second control information block, the first control information block is encoded in a repeated manner for K1 repetitions mapping to the K1 sub-bands respectively, while the second control information block is encoded in a way of only mapping to one sub-band; the K1 repetitions of the first control information block are respectively transmitted by the K1 sub-bands, while the second control information block is transmitted only once on the first channel; the first control information block is used to indicate a sub-band occupied by the second control information block; a transmitter of the first control information block is a first node, and the first node performs channel listening to determine that the K1 sub-bands out of the K sub-bands are idle;

mapping of the second control information block in a sub-band is unrelated to K1; K is a positive integer greater than 1, and K1 is a positive integer greater than 1 and no greater than K; each of the K sub-bands is on a different Bandwidth Part (BWP), or each of the K sub-bands is on a different carrier; each of the K1 repetitions of the first control information block is used to indicate a same first sub-band.

10. The second node according to claim 9, wherein the second receiver detects first data on the K sub-bands; the second control information block and the first data occupy a same sub-band out of the K1 sub-bands, and mapping of the first data in a sub-band is unrelated to K1.

11. The second node according to claim 10, wherein the second receiver detects second data on the K sub-bands; the second data occupies each sub-band among the K1 sub-bands other than the sub-band occupied by the second control information block, and mapping of the second data in a sub-band is unrelated to K1.

12. The second node according to claim 9, comprising:
a second transmitter, transmitting a first signaling;
wherein the first signaling is used to indicate configuration information of the first channel, the configuration information of the first channel comprising the K1 sub-bands; the first signaling is an Uplink (UL) Grant.

13. The first node according to claim 9, wherein the first receiver receives first information; the first information is used to determine K priorities corresponding to the K sub-bands, and the second control information block occupies the first sub-band, the first sub-band being a sub-band of highest priority among the K1 sub-bands.

14. A method in a first node for wireless communications, comprising:
performing channel listening to determine that K1 sub-bands out of K sub-bands are idle;
transmitting a first control information block and a second control information block on a first channel;
wherein the first channel occupies the K1 sub-bands of the K sub-bands; before transmitting a Uplink Control Information (UCI), the UCI is split into the first control information block and the second control information block, the first control information block is encoded in a repeated manner for K1 repetitions mapping to the K1 sub-bands respectively, while the second control information block is encoded in a way of only mapping to one sub-band; the K1 repetitions of the first control information block are respectively transmitted by the K1 sub-bands, while the second control information block is transmitted only once on the first channel; the first control information block is used to indicate a sub-band occupied by the second control information block; mapping of the second control information block in a sub-band is unrelated to K1; K is a positive integer greater than 1, and K1 is a positive integer greater than 1 and no greater than K; each of the K sub-bands is on a different Bandwidth Part (BWP), or each of the K sub-bands is on a different carrier; each of the K1 repetitions of the first control information block is used to indicate a same first sub-band.

15. The method in the first node according to claim 14, comprising:
transmitting first data on the first channel;
wherein the second control information block and the first data occupy a same sub-band, and mapping of the first data in a sub-band is unrelated to K1.

16. The method in the first node according to claim 15, comprising:
transmitting second data on the first channel;
wherein the second data occupies each sub-band among the K1 sub-bands other than the sub-band occupied by the second control information block, and mapping of the second data in a sub-band is unrelated to K1.

17. The method in the first node according to claim 14, comprising:
receiving a first signaling;
wherein the first signaling is used to indicate configuration information of the first channel, the configuration information of the first channel comprising the K1 sub-bands; the first signaling is an Uplink (UL) Grant.

18. The method in the first node according to claim 14, comprising:
receiving first information;
wherein the first information is used to determine K priorities corresponding to the K sub-bands, and the second control information block occupies the first sub-band, the first sub-band being a sub-band of highest priority among the K1 sub-bands.

19. The first node according to claim 14, wherein mapping of the second control information block in a sub-band is unrelated to K1 means includes at least one of:
the second control information block being used to generate a second-type radio sub-signal, the second-type radio sub-signal being transmitted only in the first sub-band of the K1 sub-bands; the second-type radio sub-signal occupying M1 resource elements (REs), with time-frequency positions of the M1 REs in the first sub-band being unrelated to K1; M1 being a positive integer greater than 1;
the second control information block being used to generate a second-type radio signal, the second-type radio signal being transmitted in K2 sub-bands of the K1 sub-bands, and the second-type radio signal being mapped to the K2 sub-bands in an order of firstly in frequency domain, secondly in time domain and finally in sub-bands;
the second control information block comprising K2 control information sub-blocks, the K2 control information sub-blocks being respectively transmitted by K2 sub-bands of the K1 sub-bands; K2 being a positive integer greater than 1 and less than K1; the K2 control information sub-blocks being respectively used to generate K2 second-type radio sub-signals, the K2 second-type radio sub-signals being respectively transmitted by the K2 sub-bands; any of the K2 second-type radio sub-signals occupies M2 REs, with time-frequency positions occupied by the M2 REs in a corresponding sub-band being unrelated to K1; M2 being a positive integer greater than 1.

20. The first node according to claim 17, wherein the first signaling is not used to indicate the K1 sub-bands among the K sub-bands, and the first signaling is used to indicate the K sub-bands; the configuration information of the first channel comprising the K1 sub-bands means includes at least one of:
the configuration information being applied in the K1 sub-bands;
the configuration information comprising a Modulation and Coding Scheme (MCS), the MCS being adopted by each data signal transmitted in the first channel;
the configuration information comprising a Hybrid Automatic Repeat Request (HARQ) process identification (ID), the HARQ process ID corresponding to each data signal transmitted in the first channel;

the configuration information comprising a New Data Indicator (NDI), the NDI being adopted by each data signal transmitted in the first channel;

the first channel respectively occupying K1 RE sets in the K1 sub-bands, the configuration information being used to indicate at least time-domain positions of the K1 RE sets in the K1 sub-bands or frequency-domain positions of the K1 RE sets in the K1 sub-bands.

\* \* \* \* \*